April 11, 1944.    A. W. MILLS ET AL    2,346,268
RECORD CONTROLLED PERFORATING APPARATUS
Filed July 9, 1942    13 Sheets-Sheet 1
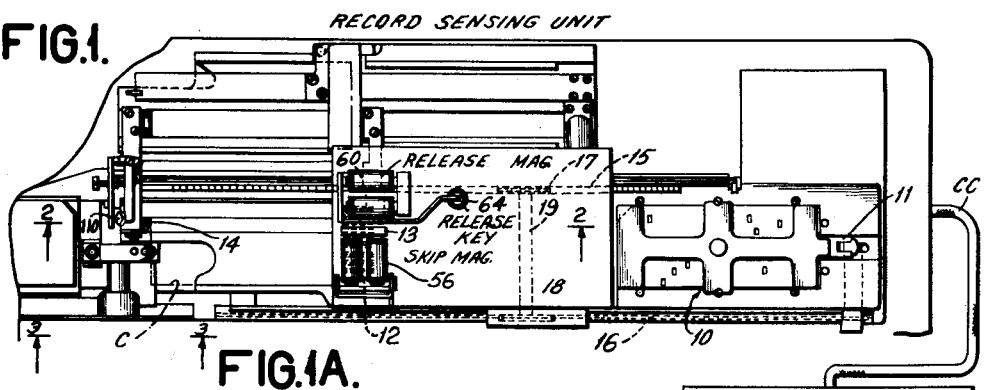
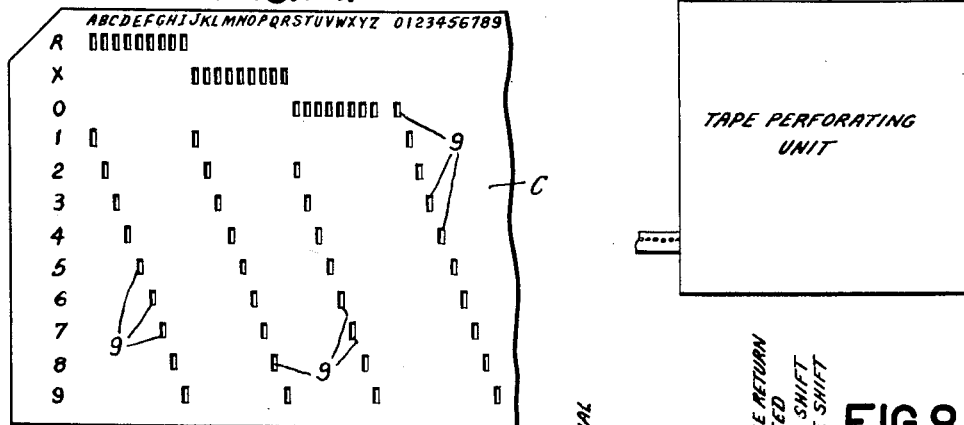
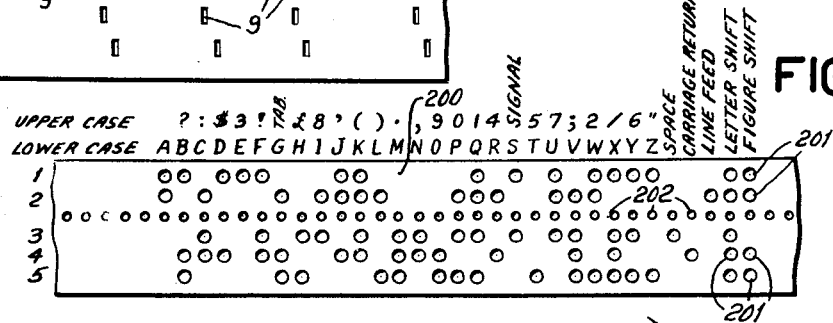
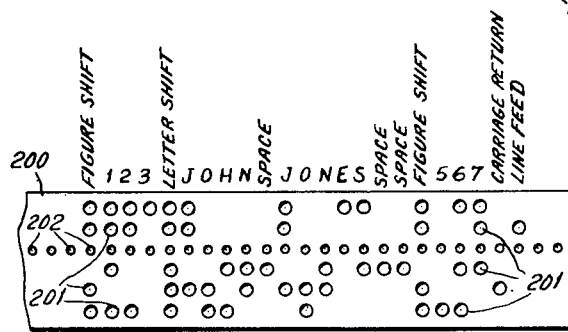
INVENTORS
Albert W. Mills
Edward J. Ralenda
BY
W. M. Wilson
ATTORNEY.

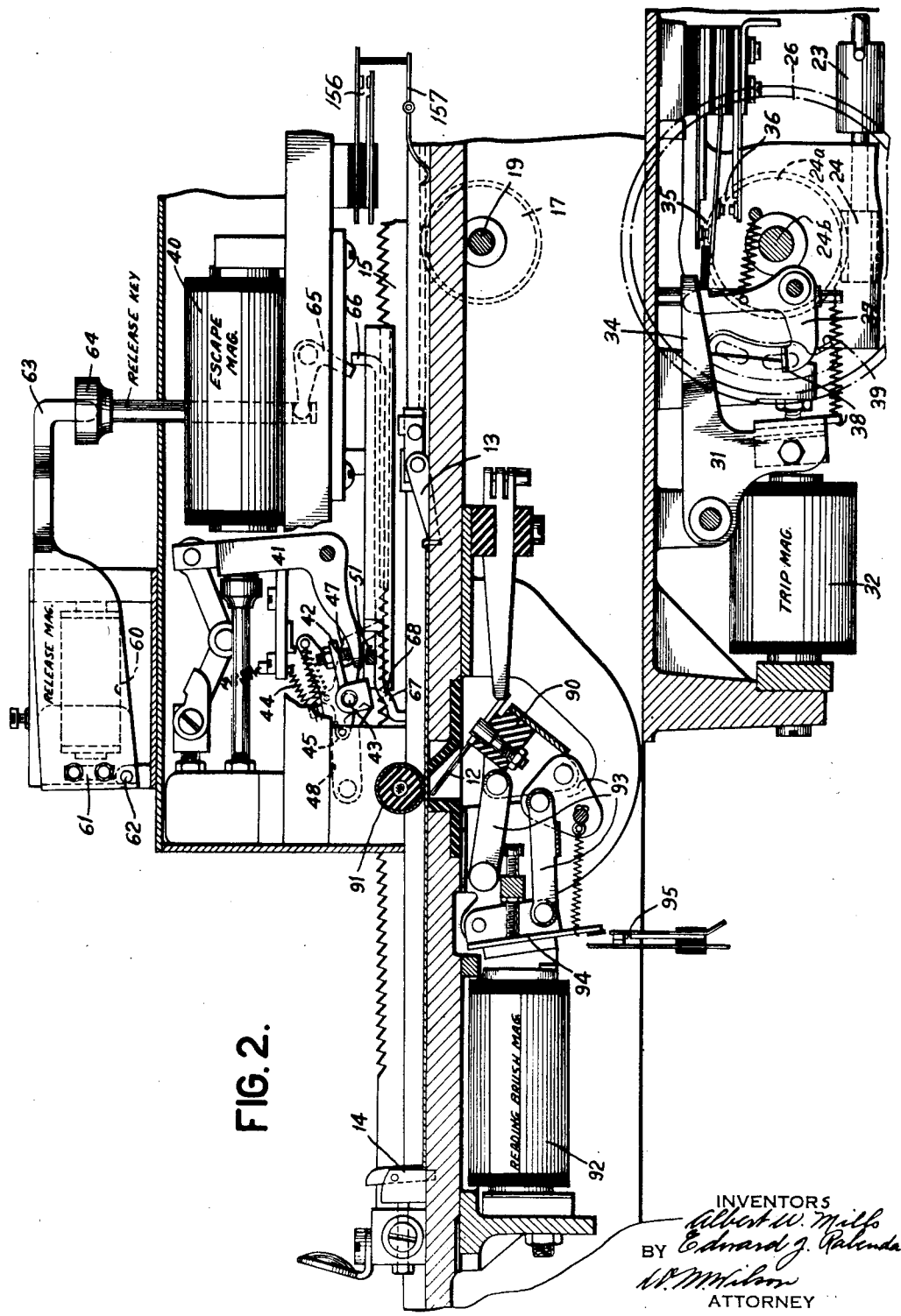

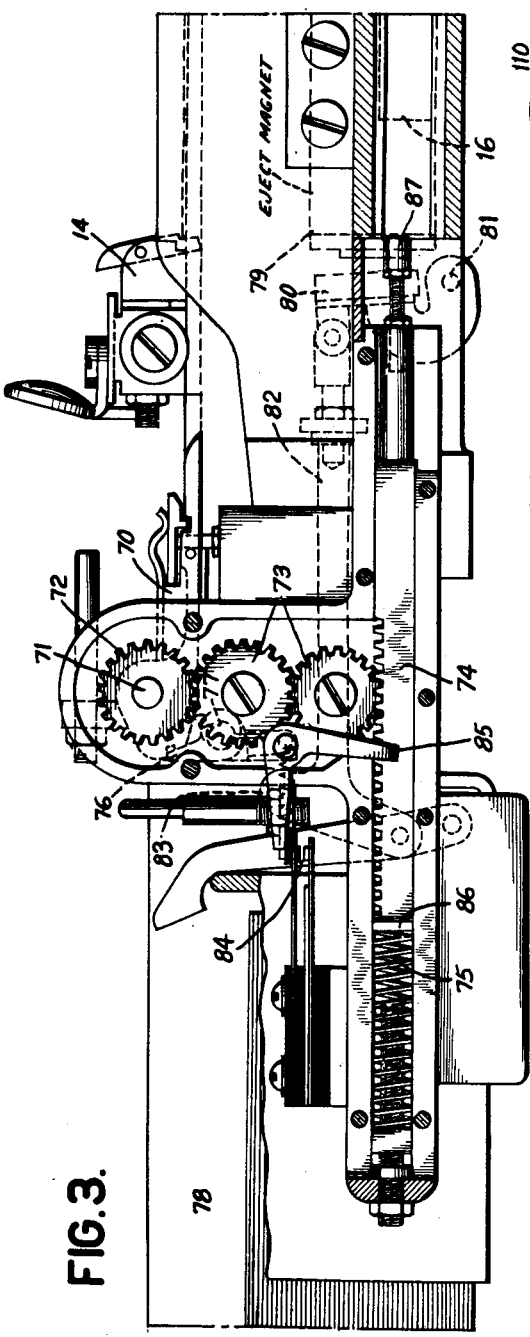

April 11, 1944.   A. W. MILLS ET AL   2,346,268
RECORD CONTROLLED PERFORATING APPARATUS
Filed July 9, 1942   13 Sheets-Sheet 4

INVENTORS
ALBERT W. MILLS
EDWARD J. RABENDA
BY
ATTORNEY

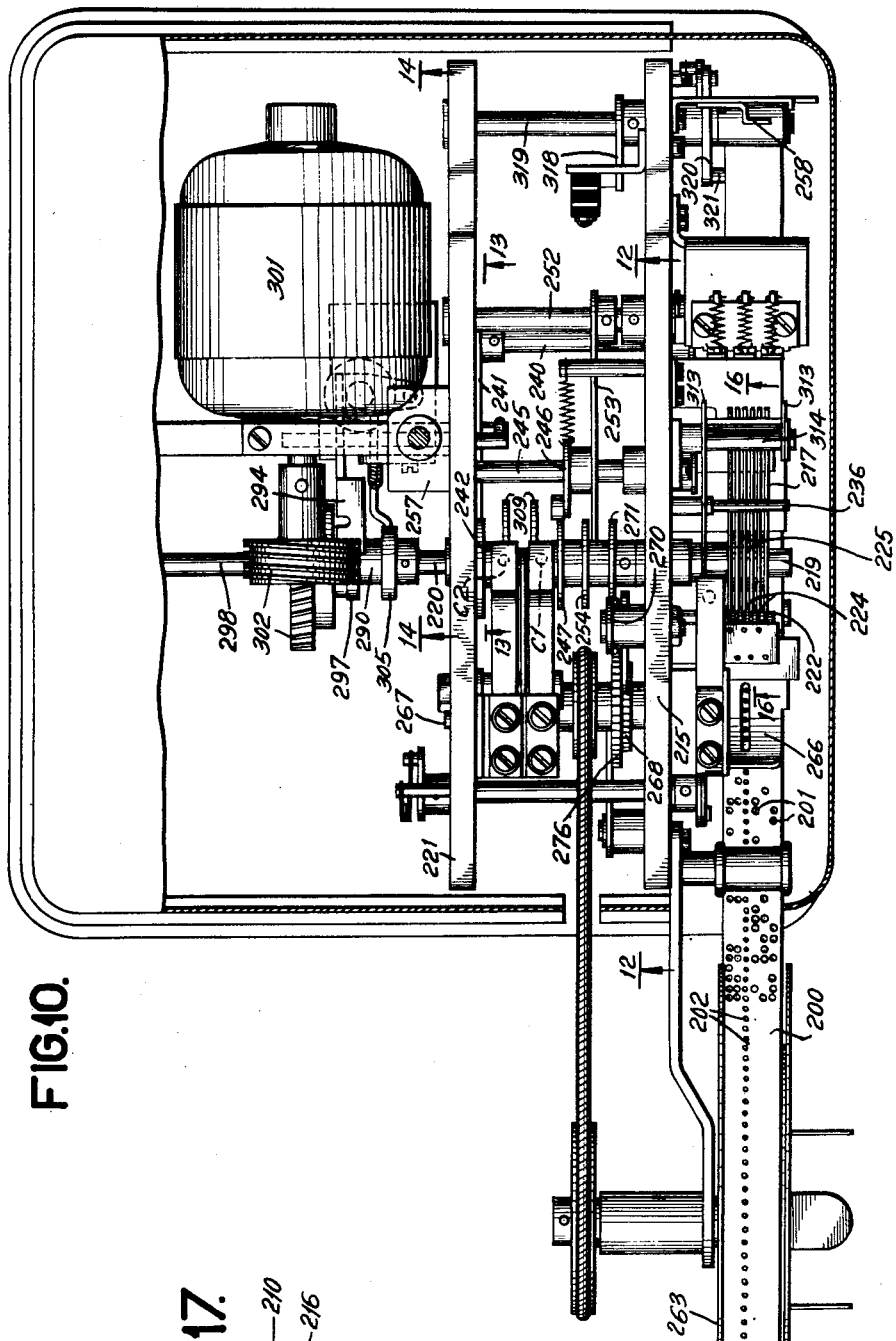
FIG.10.
FIG.17.

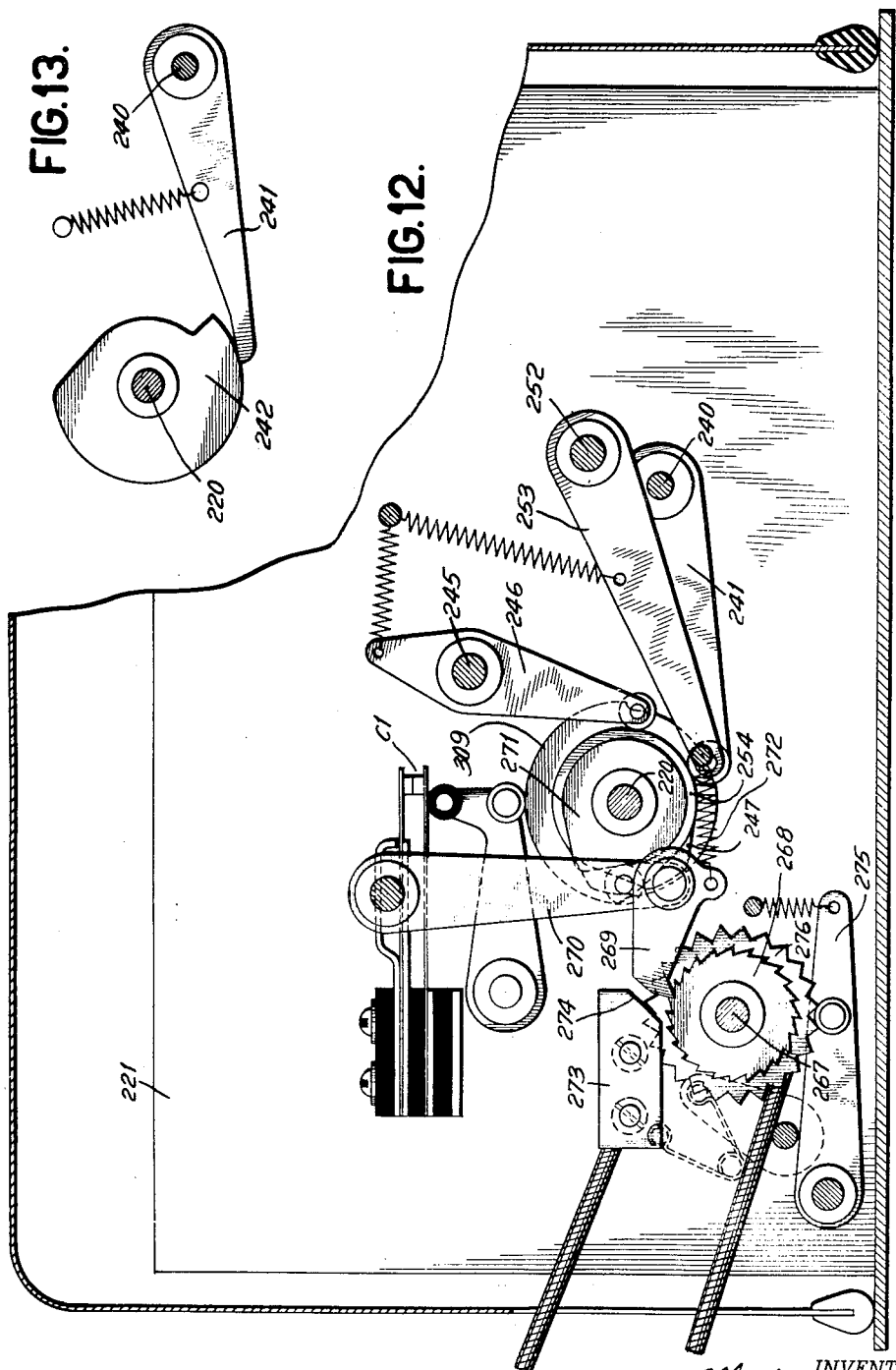

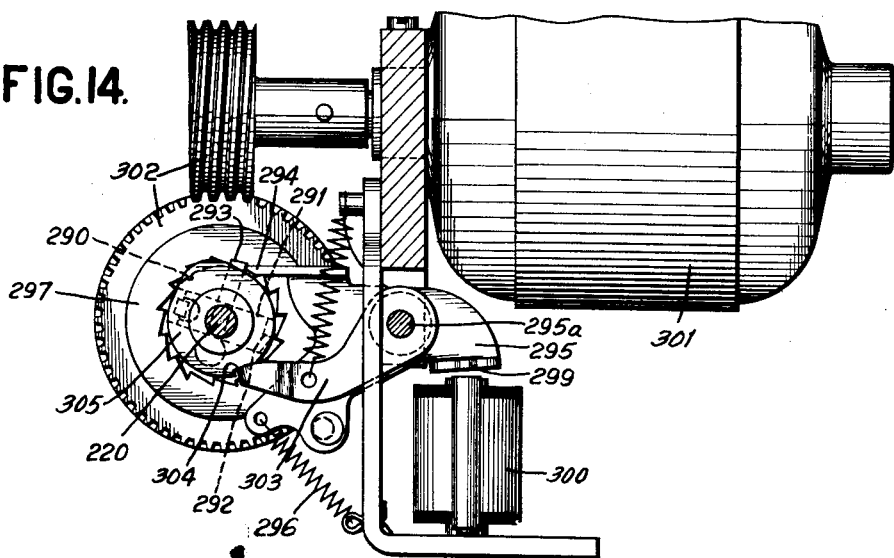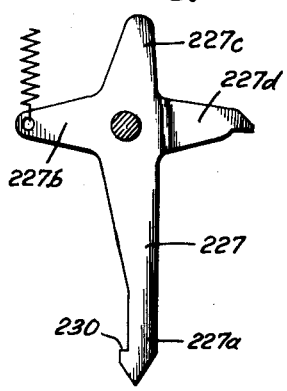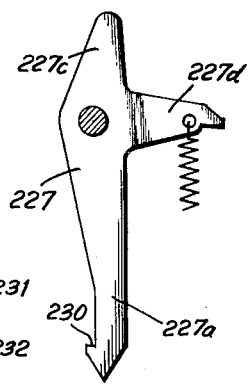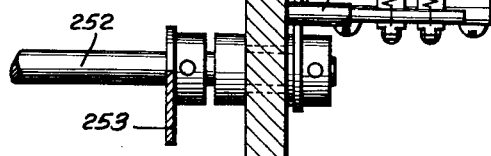

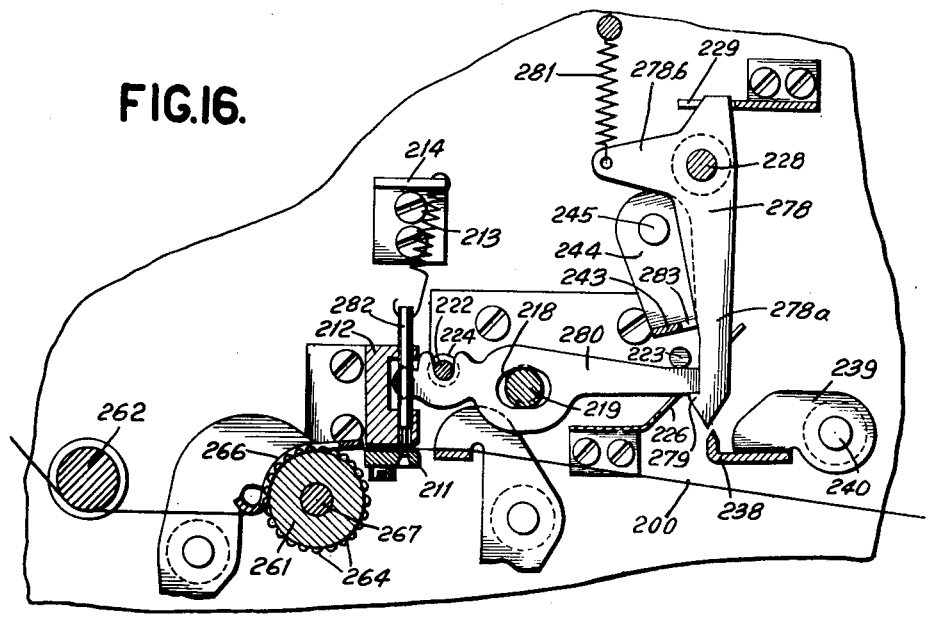
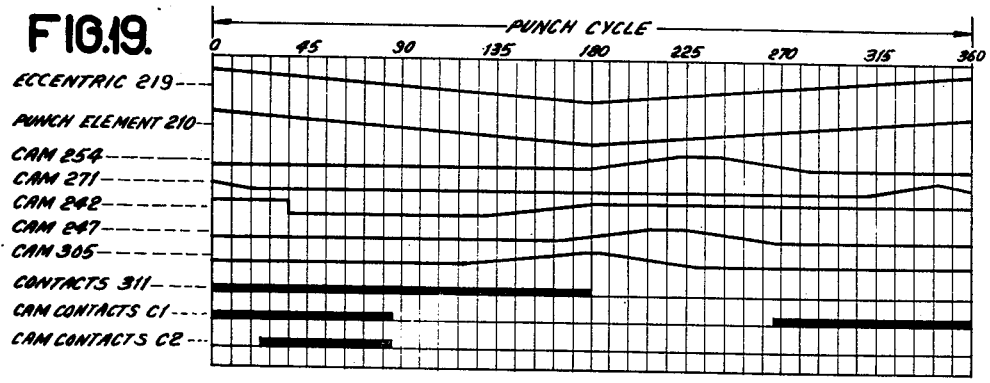

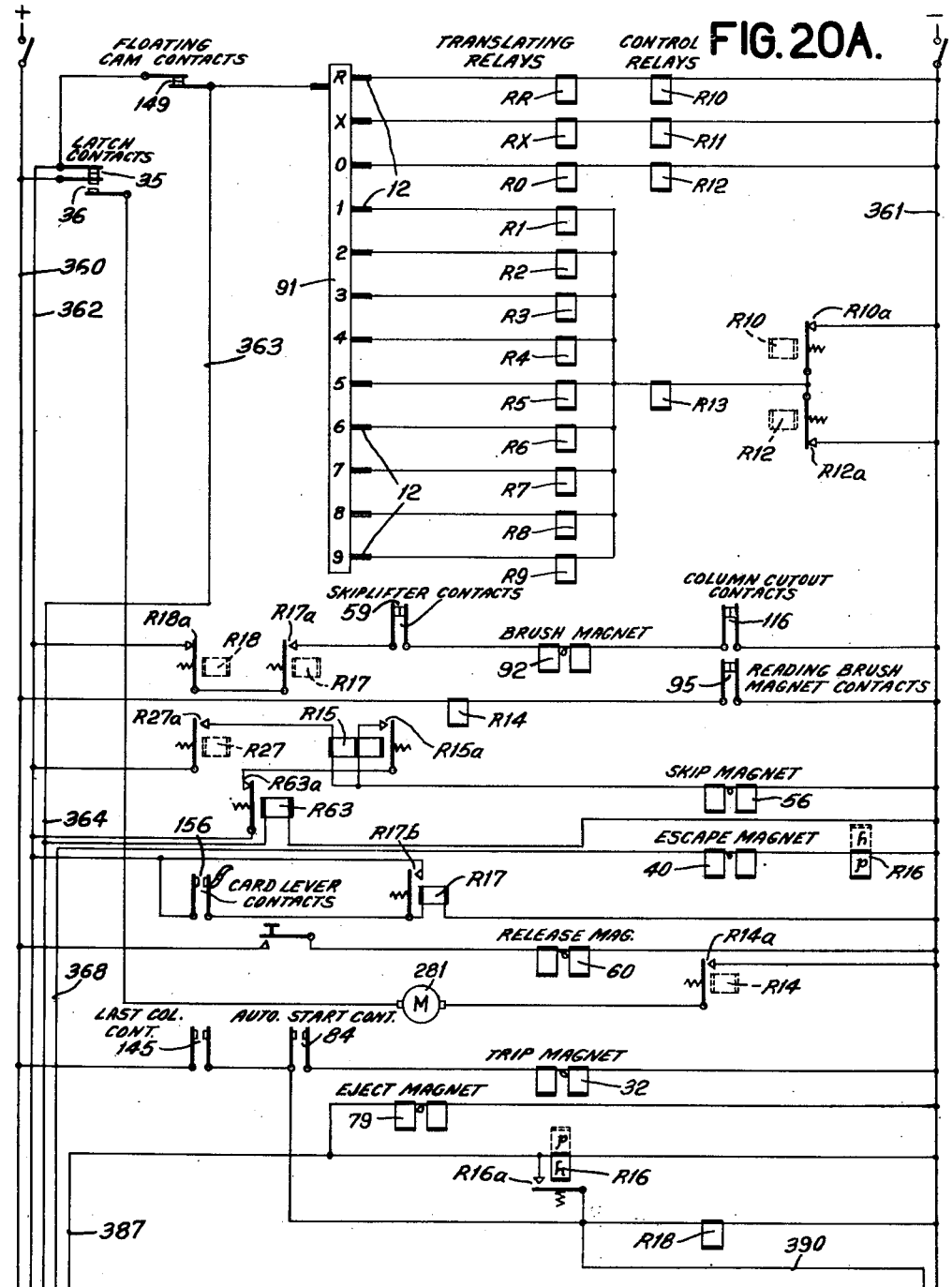

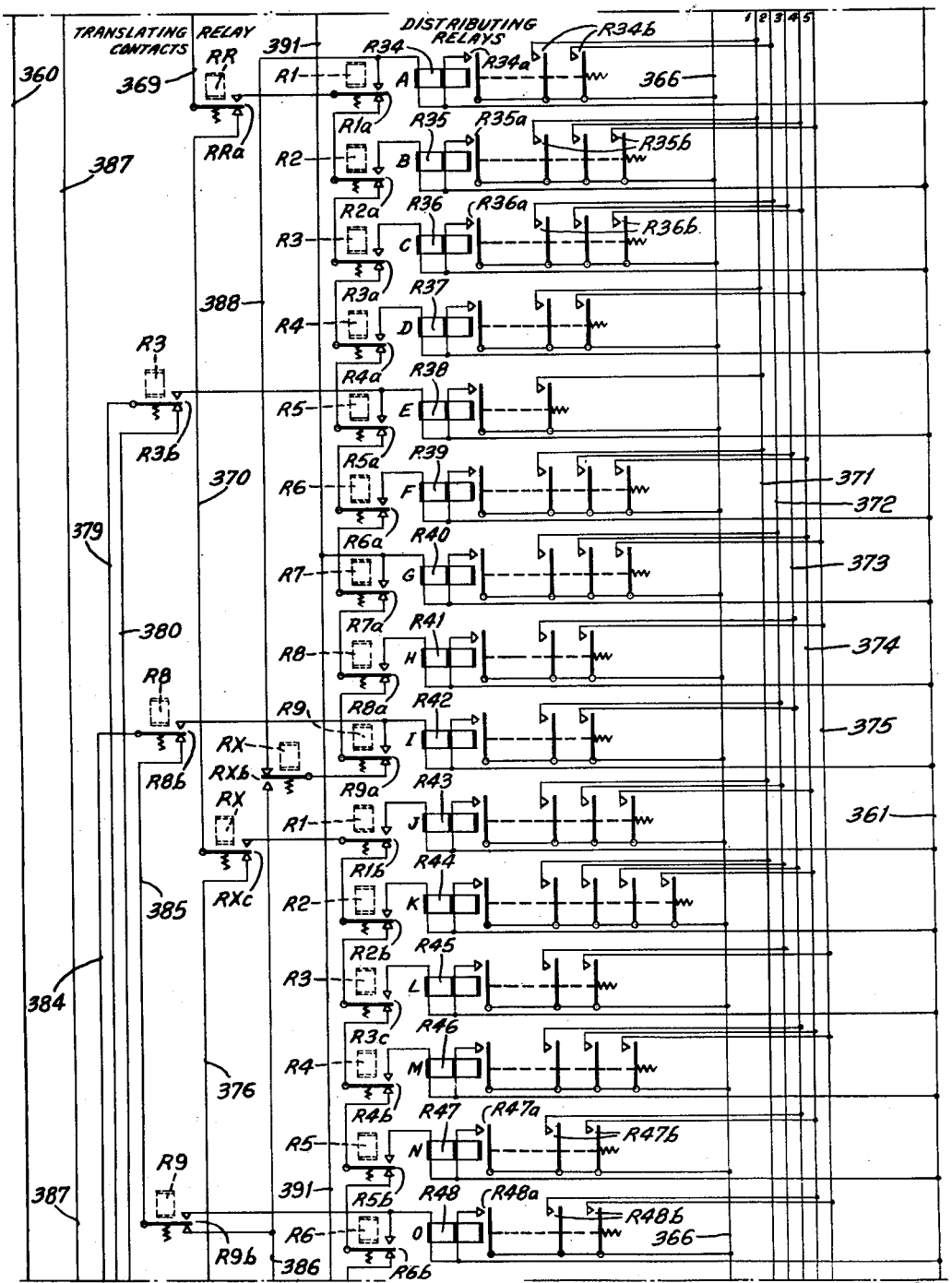

Patented Apr. 11, 1944

2,346,268

UNITED STATES PATENT OFFICE 2,346,268

RECORD CONTROLLED PERFORATING APPARATUS

Albert W. Mills, Endicott, and Edward J. Rabenda, Binghamton, N. Y., assignors to International Business Machines Corporation, New York, N. Y., a corporation of New York Application July 9, 1942, Serial No. 450,248

18 Claims. (Cl. 164—115)

This invention relates to record controlled perforating apparatus, and more particularly to such apparatus wherein the data designations are recorded on a sheet in a code different from the code of the data designations sensed on the control record; and is an improvement of the apparatus shown and described in copending application of Charles R. Doty, Ser. No. 446,877 filed June 13, 1942.

A primary object of the present invention resides in the provision of improved apparatus whereby the information recorded on statistical or tabulating cards may be perforated in telegraphic tape suitable for controlling the operations of remotely situated printing telegraph transmission and recording devices.

In the usual printing telegraph or teletypewriter systems, a five-unit Baudot or Teletype selecting code is employed to represent the various symbols to be transmitted. This code provides a maximum of thirty two different combinations so that thirty two different signals may be transmitted over the telegraph system by this code. In order to enable the transmission of more than thirty two different characters and symbols, the same code combinations, for example, are employed for designating alphabetical and numerical data; thus, it is necessary to employ a key signal for identifying the data designating code combinations or signals as alphabetical or numerical. Also, when teletypewriters or "printers" are controlled by telegraphic tapes, it is necessary that the "functional" signals (such as "carriage return") which control the teletypewriter type basket position are punched in the tape preceding the characters to be printed. These mentioned signals are punched in the tape at the beginning of each line, and for any changes from letters to numerals, or vice versa, that may occur during the printing of each line.

Accordingly, the following provisions must be made in the telegraphic tape, (1) that the "letters" and "figures" key signals or codes must be perforated in the tape preceding the character designating perforations to indicate whether the coded perforations designate alphabetical or numerical data, and (2) that "carriage return" and "line feed" signals or codes must be perforated in the tape before the character designations of the next line are recorded on the tape. These latter signals return the teletypewriter carriage to the left-hand margin, and space the paper to the next printing line.

In the present commercial statistical or tabulating systems, it is common practice to record the information or data on tabulating cards by perforations which are arranged, singly or in different combinations, in different positions in adjacent vertical columns. The statistical code, such as the Hollerith code, employed in such tabulating systems is wholly different from the five-unit code used in printing telegraph systems.

Thus, whenever it is desired to prepare a telegraphic tape in accordance with the data contained on statistical cards, and automatically under the control of such cards, it is necessary to provide the following features, (1) suitable translating means whereby the sensed data in statistical code on the cards are automatically converted into, and recorded on the tape, in the telegraphic code, (2) suitable means to determine whether the columnar data on the cards are alphabetical or numerical, and to automatically provide the corresponding key code, "letters" or "figures" on the tape preceding the character designating perforations, (3) additional means to determine the presence of any blank columns on the cards and to automatically provide for a "space" signal or code on the tape under such conditions, and (4) other additional means to automatically provide for the insertion of "carriage return" and "line feed" signals before recording the next line of characters on the tape.

The embodiment shown and described in the said copending application comprises a suitable statistical record card sensing unit, whereby each card is advanced to present successively the columns of alphabetical and numerical data designations to individual sensing elements. Groups of translating and control relays are selectively controlled by the sensing elements. The selectively controlled translating relays translate or convert the Hollerith code into the Baudot code, and control selectively the energization of code combinations of the tape punch magnets so that the alphabetical and numerical data sensed on the cards are recorded in telegraphic code on the tape. The selectively controlled control relays condition selectively a group of supervisory circuits in order to determined whether the sensed data in each column of the card contains alphabetical or numerical data, or is a blank column. In the former event, the tape punch unit is automatically controlled by the said supervisory circuits, so that its magnets are energized to perforate, first, the key signal or code "letters" or "figures," depending upon which character group (alphabetical or numerical group) the sensed data is related to, and then the code designations corresponding to the sensed data. The alphabetical or numerical data, at such times, are stored, in the translating relays, until the corresponding key code designations are recorded in the tape. In the event a blank column is detected, provision is made, whereby the said supervisory circuits cuase a "space" signal automatically to be perforated in the telegraphic tape, and also cause the card sensing unit to be controlled to sense the next column of the card. Provisions are also made, whereby the usual "R," "X," and "0" perforations on the card are sensed, translated and automatically represented on the telegraphic tape by suitable code designating perforations.

In the present application, in addition to the above mentioned features, provision is made, whereby a series or chain of timing relays are effective, each punch cycle, for controlling the operations of both the card sensing and tape punching units, and permitting synchronous operations of these units at relatively higher rates than heretofore. To this end, the said translating means, referred to hereinabove, are arranged to include a group of distributing relays, one for each character designation to be recorded, which are selectively controlled by the translating relay contacts. Provision is also made, whereby multiple spacing operations of the card carriage of the sensing unit are effected during the recording of a "tabulate" signal by the punch unit. Also, in the instant case, it is preferred to record the "carriage return" and "line feed" signals during card ejecting operations.

Accordingly, another object of the present invention resides in the provision of an improved perforating apparatus having timing means for controlling the operations of the card sensing and tape punching units, whereby these operations can be effected in a positively synchronized manner, and at a relatively higher rate.

Another object of the present invention resides in the provision of an improved perforating apparatus having a chain of timing relays for progressively controlling the conditioning of control circuits for the said card sensing and tape punching units.

Another object of the present invention resides in the provision of an improved telegraphic tape perforating apparatus wherein the translating means includes a group of distributing relays, one for each character designation to be recorded, which relays are selectively controlled, upon the sensing of the data designations, for controlling the punching operations accordingly.

Another object of the present invention resides in the provision of an improved perforating apparatus wherein automatic card skipping operations are effected, whenever a predetermined code designation is to be recorded in the telegraphic tape.

Still another object of the present invention resides in the provision of an improved perforating apparatus for automatically recording "carriage return" and "line feed" signals in the telegraphic tape during card ejecting operations.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a plan view of the sensing unit and shows diagrammatically the electrically connected record sensing and tape perforating units.

Fig. 1A is a detail of a statistical record card having coded data designating perforations formed therein in statistical code.

Fig. 2 is a section taken along lines 2—2 of Fig. 1.

Fig. 3 is a view of the left end of the card feeding mechanism showing the card ejecting devices, the view being taken substantially in the direction of lines 3—3 of Fig. 1.

Fig. 4 is a detail showing the clutch mechanism of the card carriage mechanism and the related driving motor.

Fig. 5 is a detail of the cut-out control device of the card feeding mechanism.

Fig. 8 is a detail showing the telegraphic code employed herein.

Fig. 9 is a fragmentary section of a telegraphic tape perforated by the present apparatus.

Fig. 10 is a plan view of the tape perforating apparatus.

Fig. 12 is a sectional view taken along the lines 12—12 of Fig. 10.

Fig. 13 is a detail of the cam control means for the latch lever locking means.

Fig. 14 is a sectional view taken along the lines 14—14 of Fig. 10 showing the start-stop clutch control means.

Fig. 15 is a sectional view taken along the lines 15—15 of Fig. 11 showing the arrangement of the control magnets and latching means.

Fig. 16 is a sectional view taken along the lines 16—16 of Fig. 10.

Fig. 17 is a detail of a punch element.

Figs. 18 and 18A are details of the latch levers.

Fig. 19 is a timing chart.

Figure 6:
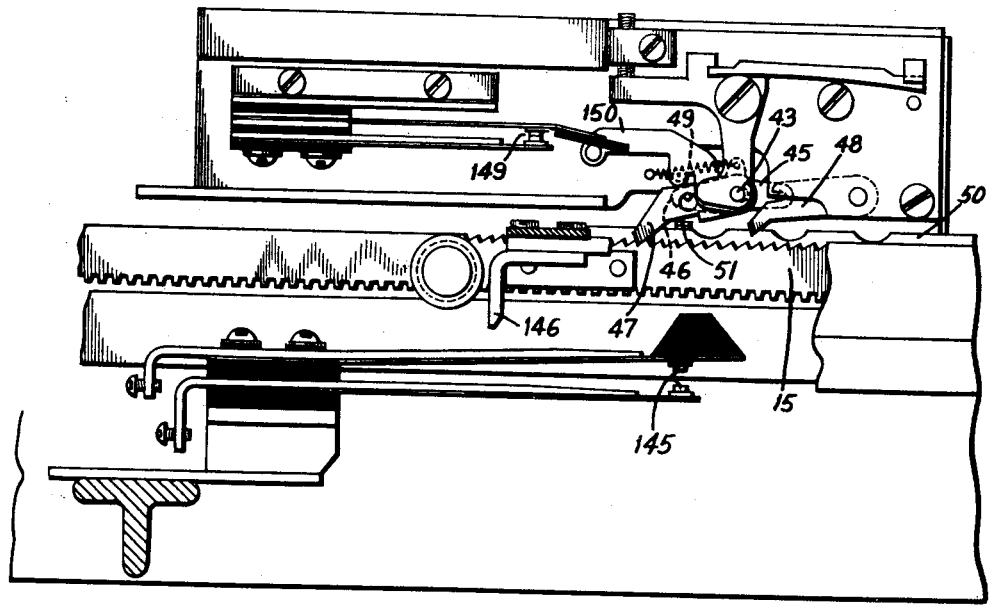
Fig. 6 is a detail of the card carriage escapement mechanism.

Figs. 20A to 20D, when arranged in vertical sequence in the order of their letter subscripts, constitute a diagram of the circuit connections of the apparatus.

*General description*

Before describing in detail the individual record sensing and tape perforating units which are shown electrically connected in Fig. 1, by a cable connection CC, and the operation of the present apparatus, a general outline of the functional operations thereof will be set forth briefly.

Individual record cards C (Fig. 1) having columns of alphabetical and numerical data recorded thereon, in the Hollerith code, are presented to a sensing station, by means of a reciprocable card carriage comprising a pusher 13 and guide 14. The individual columns of data are fed, step by step, to the group of individual sensing brushes 12 (a sensing brush 12 being provided for each index point position). The said sensing brushes 12 are connected to individual translating relays of the group RR, RX, R0, R1-R9 (see Fig. 20A), which relays are controlled selectively in accordance with the sensed data designations on the record cards. A plurality of control relays R10-R13 are connected to certain ones of the translating relays so as to be controlled selectively by the brushes in accordance with the data sensed on the cards.

The individual translating relays are provided with groups of translating contacts (see Figs. 20C and 20D) connected in cascaded relationship, which contacts, in turn, are connected to the individual distributing relays R34-R62. A distributing relay is provided for each character code designation to be recorded, and has its associated "b" contacts connected in various combinations to the common conductors 371–375, the latter including the related tape punch control magnets 232. The said translating and distributing relays are effective to translate or convert the data designations sensed in statistical code to the five-unit telegraphic code, and accordingly, control selectively the energization of the punch magnets in different code combinations, thereby causing the code designating perforations representing the data sensed on the record cards to be punched in the telegraphic tape 200 (Fig. 9).

In order to distinguish properly, whether the code designations recorded in the telegraphic tape are alphabetical or numerical data, supervisory circuits are provided, which circuits are selectively controlled by the said control relays. The said supervisory circuits include the relays R25 and R26 (Fig. 20B), which relays are conditioned selectively in order to supervise the tape punch operations. Whenever alphabetical data are sensed on the record cards, relay R26 is conditioned to cause the punch to record a "letters" key signal or code preceding the data designations representing the alphabetical data, and whenever numerical data are sensed, the relay R25 is conditioned to cause the punch to record a "figures" key signal or code preceding the numrical data designations. It is to be understood, whenever two or more columns of data sensed on the cards relate to the same group of characters, namely, the alphabetical or numerical character group, it is not necessary to provide an individual key signal or code before each character code designation to be recorded in the telegraphic tape 200. A single key signal or code preceding a group of successive code designations representing characters of the same group is sufficient.

A chain of timing relays R21–R23, and control relay R24, are provided and arranged to be operated progressively for controlling the energization of the selected distributing relay circuit, and the energization of the spacing or escape magnet 40 of the card sensing unit. These mentioned circuits are energized at predetermined times, during each cycle of operation, so that continuous operations of the card sensing and tape punching units can be effected at relatively higher speeds. Control relay R24 normally provides for continuous operation of the punch unit, by effecting energization of the tape punch control magnet 300, each cycle, before the latter becomes effective to latch or lock the punch unit in an inoperative position.

The tape punch unit normally requires one cycle of operation for recording the character code designating perforations. However, whenever a change from alphabetical to numerical characters, or vice versa, is sensed in the record cards, the sensed data is stored in the said translating relays during a preliminary punch cycle. Under these conditions, the punch unit requires two cycles of operations, so that during the first cycle the said key signal or code is recorded, and during the second cycle the said character code designations are recorded.

Whenever a blank column is detected in the record card, the said timing relays R21–R23 and control relay R24 condition certain circuits including distributing relay R60, whereby the punch unit is controlled to record automatically a "space" signal or code in the telegraphic tape 200, and the record card sensing unit is controlled, whereby the next column of the card is fed to the sensing brushes 12 in order to be analyzed.

During card ejecting operations, the distributing relays R61 and R62 are automatically controlled successively for controlling the punch unit so as to record a "carriage return" signal in the tape followed by a "line feed" signal.

Whenever a predetermined signal, such as a "tabulate signal" is to be recorded in the tape, the distributing relay R40 is operated for controlling the operations of the punch unit accordingly; at this time, an additional control circuit is established to energize relay R27 (Fig. 20B), whereupon the skip magnet 56 is called into action to effect multiple column spacing or skipping of the card carriage of the sensing unit, simultaneously with the mentioned punching operation.

The individual card sensing and tape punch units will now be described in sufficient detail for a full comprehension of the present invention. In view of the fact, that the mechanical arrangement of the card feeding and ejecting mechanism is substantially the same as that found in the machines known as the "International duplicating key punch, and alphabetical verifier," such as shown, for example, in U. S. Patent No. 1,914,263 granted June 13, 1933 to Lake et al., U. S. Patent No. 2,107,161 granted February 1, 1938, to Page, and the copending application Serial No. 296,961, filed September 28, 1939, the following condensed description thereof is deemed sufficient. The tape punch to be described is set forth and claimed in a copending application, Serial No. 449,444, filed July 2, 1942.

*Control record*

Referring now to Fig. 1A, the control record is shown to comprise a well known tabulating machine record card, generally designated C, of the type quite commonly used in the Hollerith electric tabulating systems. Differentially positioned control representations, such as perforations 9, are used to represent the various data and character designations. The perforations are differentially positioned in various columnar areas or fields of the record card, and by the differential positioning thereof different data values are imparted thereto. It is seen that the letters of the alphabet are designated by pairs of control representations or perforations, each perforation of a pair being located in one of the twelve index point positions of a columnar area. Commonly, the index point positions indicated as "R" and "X" are referred to in the tabulating systems as the "twelve" and "eleven" index point positions respectively.

The Hollerith character code shown in Fig. 1A is quite an arbitrary one and different well known codes which have been used in statistical systems may be employed in the present recording system. It will be noted by reference to the said code in Fig. 1A that the alphabet is divided into three groups. The letters of the first group A to I are designated by different combinations of a perforation in the "R" index point position with perforations in the one to nine index point positions. The letters of the second group J to R are designated by perforations in the "X" position and combination of perforations in the one to nine positions, while the letters of the third group S to Z are identified by combinations of a "0" perforation with perforations in the two to nine index point positions. The individual numerical characters are represented by a single perforation in the corresponding zero to nine index point positions. The record cards may have as many columnar areas for the reception of the data designating perforations as may be desired. The description to be set forth hereinbelow relates to mechanism commonly used in tabulating systems employing the standard eighty column record card.

Record sensing unit

*Record card feeding means.*—Referring to Fig. 1, the record cards C to be sensed or analyzed are placed in a magazine designated 10 from which they are advanced singly by means of a picker 11 toward the left to present their first column to a card sensing position above the sensing brushes designated 12 (also see Fig. 2). In this position, the reciprocable card carriage comprising a pusher 13 and a forward guide 14 engages the card and advances it, step by step, under control of the escapement mechanism to be described later. Pusher 13 and guide 14 are carried by an escapement rack 15 and the picker knife 11 is carried by a rack bar 16. Rack 15 has a gear 17 meshing with its lower edge (see Fig. 2) and bar 16 has a gear 18 (see Fig. 4) meshing with its upper edge, both gears being mounted on a cross shaft 19 (see Fig. 1). Due to this connection between the elements, the movement of picker 11 toward the left, as viewed in Fig. 1, is accompanied by movement to the right of pusher 13 and forward guide 14. At the commencement of operations, the picker and pusher are in the position shown in Fig. 1.

The operation of card feeding just outlined is more fully explained in Patent 1,772,186 granted to F. L. Lee et al. for a duplicating punching machine. The escapement mechanism referred to is of the same general nature as that disclosed in the Schaaff Patent 1,426,223 and a brief description thereof will be given later.

Secured to the under side of the base of the machine is a motor 22 (Fig. 4) coupled to a stub shaft 23 (see Fig. 2), to which is secured a worm 24 in mesh with a worm wheel 24a secured to a shaft 24b, one end of which has secured thereto a ratchet-shaped clutch element 25. Loosely mounted on shaft 24b is a gear 26 meshing with teeth on the lower edge of rack bar 16 and on which gear is mounted a disk 27 (Fig. 4). Mounted upon disk 27 is a clutch mechanism generally designated 28, one element of which is provided with a pin 29 positioned for engagement by a finger 30 integral with the armature 31 of a trip magnet 32. With the machine at rest, the parts occupy the position shown in Fig. 4 and, when magnet 32 is energized, the finger 30 will operate the clutching mechanism to couple the disk 27 to the rotating ratchet 25, so that the disk 27 and gear 26 are rotated counterclockwise to drive the rack bar 16 toward the left. The clutching mechanism is constructed, as explained in greater detail in the patents referred to, so as to remain in engagement for substantially a complete revolution, at the completion of which time the clutching mechanism engages a fixed member 33, which effects uncoupling of the parts, whereby they may automatically return to the position shown in Fig. 4 under the influence of a spring (not shown). This power drive of rack bar 16 toward the left has the same effect as the manual movement thereof explained in the said Patent 1,772,186, that is, a card will be advanced to sensing position and the pusher 13 will engage the same for further step-by-step advancement, and rack bar 16 may thereafter return to its home position without disturbing the advanced position of the card or pusher 13, this being permitted by the one-way clutch structure 21.

Also integral with the armature 31 of the trip magnet 32 is an arm 34 (see Fig. 2), the free end of which is adapted to bear upon the center blade of pairs of contacts 35 and 36 to open the former and close the latter when magnet 32 is energized, and they will be maintained in such shifted position by a latching bell crank 37, the lateral extension 38 of which is adapted to be engaged by a plate 39 secured to gear 26 at the termination of the driving movement of the latter. The contacts 35 and 36 are used to control the energization of the driving motor 22 and their function will be more fully explained in connection with the circuit diagram.

*Escapement means.*—When the card is in position above the sensing brushes 12 (Fig. 2), further advance is controlled by the escapement mechanism which in turn is responsive to the energization of escape magnet 40. Upon energization of magnet 40, its armature 41 will be rocked about a pivot in a clockwise direction and through a screw 42 secured to rod 43 will rock the rod 43 counterclockwise against the tension of a spring 44. The rod 43 is rocked as an incident to each spacing operation and has secured to one end thereof oppositely extending arms 45, 46 (see also Fig. 6), of which arm 46 is provided with a laterally extending pin for engagement with an enlarged opening in a stepping dog 47 which is loosely pivoted on rod 43. Opposite arm 45 is provided with a pin extending into a slot formed in the locking dog 48. When rod 43 is rocked, arm 46 will, through its pin and slot connection with dog 47, lift the latter out of one of the notches of the rack 15 and at the same time arm 45 will depress locking dog 48 into a notch between the rack teeth. At this time a spring 49 advances the loosely pivoted dog 47 a short distance just sufficient to permit this dog to move above the top of the next tooth. When the locking dog is again raised, stepping dog 47, due to the movement of rack 15, will ride down along the next tooth until it strikes the end thereof and the carriage is thereby arrested. The usual spring drum (not shown) is provided to bias the rack 15 toward the right, as viewed in Fig. 6. The detailed structure in this dog and rack arrangement is well known and need not be further described, and it is sufficient to note that for each operation of the escape magnet 40, the rack 15 is advanced one step or tooth, carrying with it the pusher 13 and forward guide 14, so that the card is likewise advanced one step, each step of advancement being coextensive with the columnar spacing of the columns of the card.

Figure 7:
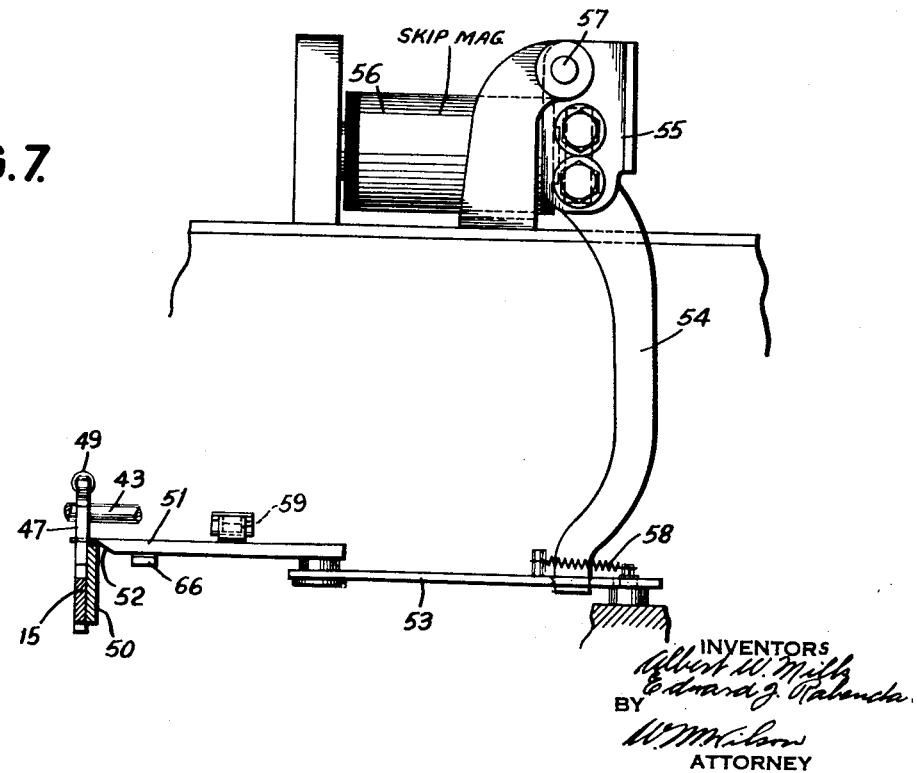
Fig. 7 is a detail of the skip magnet and the controlled mechanism.

*Skip control means.*—The machine can be provided with the usual skip bar indicated at 50 (Figs. 6 and 7) which is removably attached to the escapement rack 15 at one side thereof and provided with suitable notches and cam surfaces which cooperate with the usual skip lifter arm 51 which has a beveled end 52 (Fig. 7). The end of the lifter 51 lies under the dog 47 so that, if lifter 51 is moved toward the left, as viewed in Fig. 7, at any time that a high portion of the skip bar is in line therewith, the beveled end of the lifter will cooperate with the cam surface of the bar to raise the end of the lifter which, upon being so raised, elevates the dog 47 to release rack 15. The lifter arm 51 will drop into the next notch in bar 50 and dog 47 will interrupt further movement of the rack beyond such point. The function of this skip bar 50 is to skip over the columns or fields which are not to be sensed. The right end of the lifter 51 is connected to a slider 53 whose right hand end is provided with an opening into which the free end of a finger 54 extends. This finger is integral with armature 55 of skip magnet 56, the armature being pivoted at 57. With this arrangement, energization of magnet 56 will cause lateral shifting of skip lifter 51 with consequent skipping operations. Upon deenergization of magnet 56, the parts are returned to normal by a spring 58. Located above skip lifter 51 is a pair of contacts 59 which are opened when the lifter arm 51 is tilted by virtue of engagement with a high portion of skip bar 50. The purpose of this pair of contacts will be explained in connection with the circuit diagram.

A further means by which the card may be advanced is controlled by a release magnet designated 60 (Fig. 2) which, when energized, will rock its armature 61 about pivot 62 causing the free end of an integral finger 63 to depress a release key 64. The mechanism controlled by this key is well known in this type of machine and is briefly as follows. The lower end of key 64 through the bell crank 65 will draw a member 66 toward the right, as viewed in Fig. 2. This member 66 is suitably mounted for such movement, and at its left hand end is provided with a cam surface 67 which cooperates with the edge 68 of the supporting plate. The member 66 also extends beneath the skip lifter 51 in a position generally as indicated in Fig. 7, so that as the member 66 is moved toward the right (Fig. 2), cam 67 cooperating with plate 68 will cause an upward tilting of the left end of the member which in turn will lift the arm 51 upwardly against the stepping dog 47, whereupon the rack will be free to advance uninterruptedly toward the left. Frictional engagement of the parts will maintain the member 66 in its shifted position so that the escapement of the rack, when initiated by the release magnet 60, will not be interrupted until the card has been fully advanced, that is, until the last card column is advanced to the sensing position.

At this time a suitable projection carried by the rack will engage a depending extension of the left extremity of member 66 and will draw the member toward the left back to the position it occupies in Fig. 2. Briefly summarizing, after the card has been initially advanced to present the first card column to the sensing brushes 12, its further advance is controlled for column-by-column movement through the escape magnet 40. Multiple column advancement is controlled through the skip magnet 56 in cooperation with the skip bar 50, and the complete release of the card from any position to its last column position is controlled by the release magnet 60.

*Automatic card ejecting means.*—The machine is provided with mechanism for automatically removing the sensed cards and depositing the same in a receptacle provided for the purpose. This mechanism is more fully shown and described in Patent No. 1,916,965 issued July 4, 1933, to J. M. Cunningham. Briefly, a gripper 70 occupies the position shown in Fig. 3 with its jaws open in card receiving position during the period that the card is advanced by the escapement mechanism. The gripper is carried by the rod 71 to which is secured a gear 72 which through idlers 73 is connected to a slidable rack 74 which is normally biased toward the right by a spring 75. A pivoted latching member 76 engages a latching shoulder at the left hand extremity of the gripper and thereby serves to hold the parts in the position shown in Fig. 3. When the latching member 76 is rocked counterclockwise about its pivot 77, the spring 75 will be free to drive the rack 74 toward the right and through the gearing 73, 72 flip the gripper 70 in a counterclockwise direction. This flipping action is effected after the card has been advanced to its extreme left hand position, at which time the leading edge thereof is between the jaws of the gripper. Releasing the gripper will cause the jaws to automatically clamp the end of the card thereto so that the card will be swung in an arc about the rod 71 and deposited in the receptacle 78, suitable means being provided to cause the jaws to release the card.

For the purpose of actuating the latch member 76 there is provided the usual eject magnet 79 which, when energized, will rock its armature 80 about pivot 81 and draw a link 82 toward the right. The left extremity of the link is provided with an extension 83 which, when the link is moved, will strike a depending arm of the latch member 76 and effect the rocking action thereof which results in the ejection of the card by the gripper. This ejecting operation will bring about the automatic feeding of another card from the magazine 10 to the sensing brush. This operation is initiated by means of a pair of automatic start contacts designated 84 which are closed through a pivoted bell crank 85, a depending arm of which is engaged by an extension 86 in rack 74 when the rack has been released for movement toward the right.

In a manner to be explained in connection with the circuit diagram, the contacts 84 control the operation of the driving motor which, as explained, will cause advance of a new card from the magazine and also cause movement toward the right of card pusher 13 and forward guide 14. As the rack 16 is moved toward the left, its left hand end will engage an adjustable extension 87 carried by the rack 74 which will positively restore the rack toward the left and through the gearing shown will return the gripper to the position it occupies in Fig. 3, the latch member 76 being spring-biased to engage and hold the gripper in such position until the newly advanced card has been sensed and advanced to its last column position, whereupon the automatic ejection and initiation of a new card feeding operation will take place.

*Record card sensing means.*—The card sensing brushes 12 are shown in Fig. 2. There are provided twelve of these brushes positioned side by side, there being one for each of the usual twelve rows of index point positions of the card. The brushes 12 are mounted in an insulating brush holder 90 which is mounted so that the brushes 12 are given substantially a vertical movement upwardly, from the position shown in Fig. 2, to contact the card and effect electrical connections through the perforations therein with a common contact roller 91. The upward movement of the brushes 12 is controlled by the reading brush magnet 92 which, when energized, will cause the brushes 12 to move upwardly through mechanism generally designated 93. This mechanism is of the usual construction and a detailed description thereof may be found in the patents referred to. Its purpose is generally to maintain the brushes in their lower position, when they are not actually sensing perforations in the card, and thereby preserve them against undue wear and also against damage by any inadvertent backward movement of the record cards. The armature 94 of magnet 92 is arranged when attracted by the magnet to open a pair of contacts 95, whose function will be explained in connection with the circuit diagram.

*Miscellaneous contact means.*—Several contacts in addition to those described are provided in the machine, and the operation of these will be pointed out before the entire operation of the apparatus is explained in connection with the circuit diagram.

In Fig. 5, a finger piece 110 pivoted at 111 (also see Fig. 1) is shown mounted on a cross arm 99, which finger piece also has a depending arm 112. When it is desired to manually backspace the card carriage, it is done by pressing against the finger piece 110, whereupon a slight rocking thereof is effected before the card carriage actually moves. During this slight rocking, the extension 112 will rock on universal bar 113 about its pivot 114 to cause a depending arm 115 thereon to open the so-called cut-out contacts 116, which are provided in the reading brush magnet circuit to insure that this magnet is deenergized, and that the related brushes are in a down position before there is any backward movement of the card which might injure the brushes.

In Fig. 6 is shown a pair of contacts 145 known as the "last column contacts." These contacts are closed by an arm 146 secured to the escapement rack and so located that, when the escapement rack is advanced to the position in which the last column of the card is presented to the sensing brushes, the extension 146 will be in engagement with and close contacts 145. Also in Fig. 6 are shown the "floating cam" contacts 149, one blade of which is shifted by an arm 150 which is loosely pivoted on the rod 43 and which has a lateral extension resting upon the upper edge of the stepping dog 47 so that during escapement from one column to another, the incidental raising of the stepping dog 47 through arm 150 will cause opening of contacts 149 during the period that the dog is raised. In Fig. 2 there is shown a card lever 157 lying in the path of the record card as it passes from the magazine to the sensing position. When a card is fed from the magazine, the card lever is rocked to close a pair of suitably disposed contacts 156.

*Perforated telegraphic tape*

Referring now to Fig. 8, a tape 200 is shown provided with successive transverse rows of perforations 201 arranged in accordance with the well known five-unit telegraphic code, usually referred to as the Baudot or Teletype permutation code. In a five-unit code system only thirty two possible permutations are available, and, as mentioned hereinabove, for this reason, it is necessary to employ the same code combinations to represent the alphabetical characters, and the numerical and other designation characters.

In order to distinguish the alphabetical characters from the other remaining characters, for telegraphic transmission purposes, the alphabetical signals or code designations are always preceded by a "letter shift" signal or code designation, and the other remaining character signals or code designations are preceded by a "figure shift" signal or code designation. Whenever, it is desired, in the telegraphic printed copies, to have spaces appear thereon, it is necessary to insert "space" code designations in the perforated tape. For example, in the perforated tape shown in Fig. 9, the indicated code perforations are arranged so as to designate 123 John Jones 567; which arrangement of code designations in the perforated tape is necessary when the tape is employed for controlling the known types of printing telegraph apparatus. The usual smaller feed perforations 202 are also shown to be provided in the tape 200, as well as the "carriage return" and "line feed" perforations which are provided at the end of each line of information.

A suitable mechanism for perforating a tape in accordance with the said Baudot or Teletype code will now be described.

*Tape perforating unit*

Figure 11:
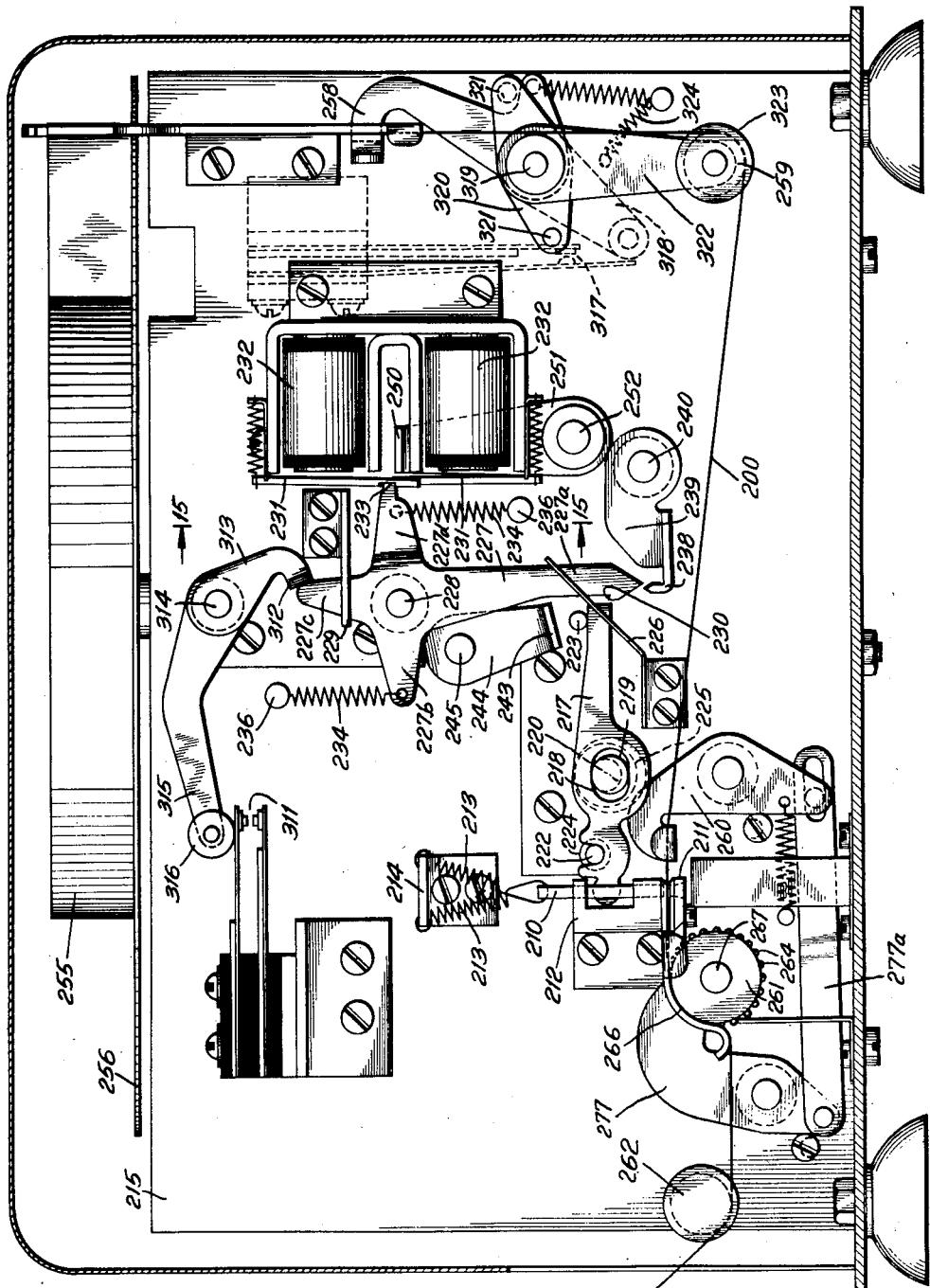
Fig. 11 is an elevational view of the perforating apparatus.

Referring now to Figs. 10 and 11, the perforating apparatus is shown to include individual punch elements 210, one for each unit of the telegraphic code, and a common die block 211. The punch elements are slidably arranged in individual openings in a common punch guide block 212, and are normally held in retracted positions by means of individual springs 213. The said springs are supported by a bracket 214 which is suitably secured to an upright plate 215. The said punch guide and die blocks are also suitably secured to the plate 215. Each punch element 210 is provided with a recess 216 (see Fig. 17), into which recess is placed one end of a positionable punch lever 217 having an oval shaped opening 218. An individual punch lever is provided for each punch element. An elongated cam or eccentric 219 is carried by or, if desired, formed on shaft 220, which shaft is suitably journaled in the said plate 215 and upright plate 221. The eccentric 219 is disposed within the oval shaped openings of the individual punch levers to support and actuate or oscillate the said levers. Suitably disposed stop guides or rods 222 and 223 are provided to maintain proper alignment of the said punch levers.

In order to space the punch levers properly, suitable loose fitting spacing washers 224 and 225 are provided on rod 222 and eccentric 219, respectively, and disposed between each punch lever 217, as shown in Figs. 10 and 11. In addition thereto, the free ends of the individual punch levers extend into correspondingly spaced, individual slots formed in a guide comb 226 suitably secured to plate 215. Normally, during the rotation of the eccentric, the punch levers are moved downwardly and upwardly (as viewed in Fig. 11) about the pivoted connections formed by the ends of the punch levers engaging the recesses of the related punch elements. Under these conditions, it is seen that the free ends of the punch levers are partially rotated first in one direction and then in the reverse direction, or, stated in other words, the said free ends of the punch levers are oscillated.

Individual, suitably spaced latch members or levers 227 are provided, one for each punch lever, said latch levers being pivotally supported by a stud shaft 228 and having the depending arms 227a and upright arms 227c loosely fitted into individual slots in guide combs 226 and 229, respectively, the latter also being suitably secured to plate 215. Near the extremity of each arm 227a, a latching shoulder 230 is provided, which shoulders are disposed in close proximity to, but normally held out of, the paths of the rotatable ends of the punch levers, by means of the individual and related latching armatures 231 of magnets 232. Each armature 231 is provided with a shouldered recess 233 and, when released, engages the tip of arm 227d of the related latch lever 227 to latch the latter and hold the arm 227a out of the path of the free end of the related punch lever.

Upon momentary energization of magnet 232, the related armature 231 is attracted to trip or release the engaged arm 227d, and permit the related latch lever 227 to swing in a clockwise direction, under influence of spring 234, thereby positioning the shoulder 230 of arm 227a in the path of the free end of the related punch lever 217.

It should be mentioned at this time, that, in the present embodiment, the shaft 220 carrying the eccentric 219, can be operated in a start-stop manner, and accordingly, provision must be made whereby the latch levers 227 are arranged to be positioned to latch the desired punch levers, at the start of each cycle, before the rotated eccentric displaces or oscillates the said punch levers. Thus upon latching of a punch lever 227 and rotation of the eccentric 219, the said punch lever is positioned by the eccentric about the pivotal connection formed by the arm 227a of the latch lever 227 and the latched end of the punch lever, to force the related punch element 210 downwardly (Fig. 11), thereby causing the sheet, such as a telegraphic tape 200, interposed between the said guide and die blocks to be perforated.

It should also be mentioned, that individual springs 234, having the one ends thereof secured to posts 236, are attached to arms 227b and 227d of alternate latch levers 227 for normally urging the related latch levers in a clockwise direction. Due to the close spacing of the latch levers, the springs are alternately arranged as mentioned. For this reason, only the alternate latch levers 227 need be provided with arms 227b (see Figs. 18 and 18A). The related armatures 231 and magnets 232 are also placed in staggered positions, as shown in Fig. 15, in order to provide an extremely compact arrangement of the magnets and latch levers.

Locking means are provided for holding the displaced latch lever or levers in a latched position, and for preventing displacement of undesired latch levers during the rotation of the eccentric. This means comprises a locking bail 238, which is common to all latch levers 227, and which is suitably secured to an arm 239, which arm 239 in turn is fixed to shaft 240. Shaft 240 is rotatably mounted in the said plates 215 and 221 and also has affixed thereto a spring urged cam follower arm 241 (also see Figs. 12 and 13) cooperating with cam 242 secured to the shaft 220. Cam 242 is shaped so that normally (with the shaft 220 in a stop position) the locking bail 238 is held in a position so as to be out of the path of the extremity of arm 227a of each latch lever 227. Upon displacement of the desired latch levers in the said latching position and upon rotation of shaft 220, the follower arm 241 drops from the high portion of the cam 242 to permit the locking bail 238 to be raised (in Fig. 11) in the path of the said arms 227a, thereby engaging the extremities of arms 227a of the displaced latch levers and locking them in the latching position (also see timing chart in Fig. 19). This position of the said locking bail also prevents any faulty displacement of the normally positioned latch levers, since the bail is now effective to engage the extremity of arm 227a of any latch lever which inadvertently might be displaced during the rotation of shaft 220, thereby blocking further clockwise rotation of these latch levers and preventing engagement of the latching shoulders 230 and the latching ends of the related punch levers 217. The said raised position of locking bail 238 is maintained until the sheet or tape 200 is perforated, when the high portion of cam 242 again engages the follower arm 241 to lower the said bail. Obviously, the said bail must be lowered before the latch levers 227 are positively restored by the action of a reset bail 243.

For this arrangement, it is preferred to render the reset bail 243 effective from approximately the 207° point to the 225° point in the said cycle (see Fig. 19). The said bail 243 is secured to arm 244, which arm in turn is fixed to shaft 245 journaled in the said plates 215 and 221, which shaft has affixed thereto a spring urged cam follower arm 246 (Fig. 12) cooperating with a related cam 247 secured to shaft 220. Said cam 247 is effective, during each cycle of rotation of shaft 220 (see Fig. 19), to partially rotate the follower arm 246 and shaft 245 in a counterclockwise direction (Fig. 12) to cause the bail 243 to positively urge and restore the latch levers 227 to the normal latched position out of the path of the latching ends of the related punch levers 217, as shown in Fig. 11. Upon release of the latched punch levers 217, the punch elements are withdrawn immediately from the perforated tape under influence of the related springs 213. For this condition, the punch levers are positioned about the eccentric 219 as a pivot. It is evident from the description to follow, if it is desired to withdraw the punch elements positively from the tape under influence of the eccentric, it is merely necessary to prolong the period during which the punch levers are held in latched positions by levers 227 and delay the period in the cycle during which the bails 243 and 250 are operated for resetting and latching the said levers 227.

Reset means are also provided for positively restoring the attracted armatures 231 of magnets 232 to the normal positions, shown in Fig. 11, at the time bail 243 is operated for resetting the latch levers 227. This means comprises a bail 250 which is arranged common to the free ends of armatures 231 (also see Fig. 15) and is secured to or formed as an integral part of an arm 251 secured to shaft 252, the latter being suitably journaled in plates 215 and 221. Shaft 252 has affixed thereto a spring urged cam follower arm 253 (Fig. 12) cooperating with a related cam 254 secured to shaft 220. This cam is effective, at the same time during which cam 247 positions bail 243 (see Fig. 19), to urge the said bail 250 in a counterclockwise direction to move positively any of the displaced armatures 231 to the normal position, in order to engage and latch the released arms 227d of the latch levers 227.

Suitable means for intermittently advancing the tape 200 are provided, which means in the present arrangement are operated near the end of each cycle of rotation of the said shaft 220. The tape 200 is fed, step by step, from a suitable supply 255, the reel 256 for which is loosely mounted in support 257 secured to plate 221, under a pivoted tape lever 258, over hinged roller 259 and tape guide member 260, between the separated blocks 211 and 212, over a sprocket wheel 261, and under a guide post 262 to the take-up reel 263. Said sprocket wheel 261 is provided with centrally located and equally spaced teeth 264 for engaging the centrally located feed perforations 202 in the tape 200. The usual positionable arcuately shaped and slotted tape finger guide 266 is provided to press the tape against the said sprocket wheel. Sprocket wheel 261 is fixed to shaft 267 journaled in plates 215 and 221. Shaft 267 has secured thereto a ratchet wheel 268 (Fig. 12), which is advanced step by step by a spring urged cooperating pawl 269 pivotally mounted on a cam follower arm 270.

Cam follower arm 270 is pivotally mounted on plate 215 and urged against a related cam 271 by spring 272. Near the end of each cycle of shaft 220 (see Fig. 19), the high point of cam 271 moves the cam follower arm 270 and pawl 269 to the left, as viewed in Fig. 12, to advance the ratchet wheel 268 one step, and consequently the sprocket wheel 261. Thus, the tape 200 is advanced to present the next position thereon to the punching elements. During further rotation of cam 271, spring 272 is effective to cause the pawl 269 to ride over a tooth of the ratchet wheel and be in a position for another feeding operation.

A fixed plate 273 secured to plate 215 is provided with a camming surface 274 which is engaged by the free end of pawl 269, as the latter is urged to the left (Fig. 12), thus insuring a positive driving connection between the pawl and ratchet wheel and also preventing an overdrive of the ratchet wheel. The usual spring urged detent arm 275 is provided and cooperates with a detent wheel 276 fixed to shaft 267 for maintaining the said shaft 267, ratchet wheel 268 and sprocket wheel 261 in the advanced position.

In order to facilitate tape insertion and removal operations, the tape finger guide 266 is secured to an arm 277 pivotally mounted on plate 215, which arm is pivotally connected to one end of link 277a, the other end of which is connected by a pin and slot connection to the pivotally mounted and spring urged tape guide member 260. Thus, whenever the guide 266 is raised manually, the guide member 260 is also partially rotated in a counterclockwise direction (Fig. 11), so that the tape becomes easily accessible on both sides of the punch station.

From the description up to this point, it is understood that, at the start of each cycle of rotation of shaft 220, the latch levers 227 are released and positioned in any desired combination, upon energization of the related magnets 232, so as to be partially rotated in a clockwise direction (Fig. 11), in order to latch the free ends of the related punch levers 217. Next, the locking bail 238 is operated to engage and lock the displaced latch levers 227 in a latched position, during part of the cycle, and to prevent further latching operations by the remaining latch lever or levers during this cycle.

Eccentric 219 is then effective to oscillate the latched punch levers 217 causing the connected punch elements 210 to be operated to perforate the tape 200, in accordance with the selected combination of operated punches, while the said tape is at rest at the punching station (see code groups of perforations 201). After the punching operation, the locking bail 238 is restored to its normal position and the reset bails 243 and 250 are rendered operative to restore the latch levers 227 and armatures 231, respectively, to their normal positions, thereby releasing the latching ends of the related punch levers and permitting the punch elements to be withdrawn from the tape. The tape feeding mechanism is then rendered operative, near the end of the cycle, to advance the tape one step, thus presenting the next punching position on the tape to the said punch elements.

It should be mentioned at this time, that the centrally located perforations 202 are not originally provided in the tape 200 but are formed therein during each punching operation. Referring now to Fig. 16, it is seen that for this purpose a special latch lever 278 is provided, which is also pivotally mounted on stud shaft 228 and disposed in related slots in the guide combs 226 and 229. This latch lever is also provided with a latching shoulder 279, similar to latching shoulders 230, which shoulder 279 constantly engages the latching end of the related punch lever 280 under the influence of spring 281, so that during each punching operation the said lever 280 is effective to operate the connected punch element 282, similarly as described hereinabove. In this way, the centrally located feed perforations 202 are formed in the paper tape. It is to be noted that latch lever 278 is not provided with a latch arm similar to arms 227d, and obviously there is no need for it, since latch lever 278 always is maintained in a latching position. Also, it is to be noted in Fig. 16, that the reset bail 243 is provided with a recess 283 so that, during the resetting of latch levers 227, the said special latch lever 278 is not engaged by the said bail and accordingly no release of punch lever 280 is effected during the resetting operations. After perforation of the tape, each cycle, the related punch element is withdrawn from the tape under the influence of the eccentric 219. Since the punch lever is latched constantly, a pivotal connection is formed by the latched end of punch lever 280 and the stop guide or rod 223 thereby enabling the eccentric to positively restore the punch element to its normal retracted position.

In order to control the start-stop operations of shaft 220, a well known type of electromagnetically controlled, one-revolution clutch means is provided. For a detailed description of a similar clutch mechanism reference should be made to U. S. Patent 2,206,646, issued to Schneider on July 2, 1940. Accordingly, the brief description to be given is deemed sufficient for complete comprehension of the present invention. In Figs. 10 and 14, this clutch means is shown to comprise an annular member 290 which is secured to shaft 220. A slidable and spring urged dog member 291 is disposed in a suitable channel formed in the said annular member, which dog member is provided with a single tooth 292. A dog lift lever 293 is pivotally mounted in the annular member 290 and is disposed in a suitable channel-way formed in the slidable dog member 291. The free end of the said dog lift lever extends beyond the periphery of the annular member 290 and normally is positioned against a stop 294 formed on the suitably pivoted lever 295 (secured to stud shaft 295a), which lever normally is urged by spring 296 so that the said stop 294 is in the path of the dog lift lever 293. With the described elements of the clutch means in this position, the dog lift lever 293 is effective to hold the dog member 291 so that the single tooth formed thereon is out of the path of a ratchet wheel 297 secured to constantly rotated shaft 298, and disposed in close proximity to the annular member 290.

Secured to the said pivoted lever 295 is an armature 299 of an associated and suitably disposed magnet 300, which armature upon momentary energization of magnet 300 positions the stop 294 of lever 295 out of the path of the dog lift lever 293, thereby releasing the latter and permitting the dog member 291 to be positioned so that its tooth 292 engages the ratchet wheel 297. Shaft 298 is constantly rotated by means of motor 301, the shaft of which is connected to shaft 298 by a suitable worm and worm wheel drive 302. In this manner shaft 220 is rotated. Upon completion of a cycle of rotation of shaft 220, the dog lift lever 293 is urged against the said stop 294 to disconnect the tooth 292 of the dog member from the constantly rotated ratchet wheel 297, thus preventing further rotation of this shaft. Suitable locking means are provided for this described clutch, and comprises a suitably disposed, spring urged arm 303 (secured to stud shaft 295a) cooperating with a suitable notch 304 formed in a cam 305, the latter being fixed to shaft 220. The high point of cam 305 cooperating with arm 303 serves as a positive resetting device for stop 294 and armature 299 (see Fig. 19).

With reference again to Fig. 11, a pivoted bail 312 is provided which is common to the arms 227c of latch levers 227 and supported by arms 313 (Fig. 10) mounted on shaft 314. One of the said arms 313 is provided with an extension arm 315 and roller 316 so that, upon the displacement or release of any latch lever 227, the described bail assembly is partially rotated in a counterclockwise direction to close the suitably disposed contacts 311. In the instant case, the contacts 311 are employed, at certain times, for controlling the energizations of the clutch control magnet 300, and it will be seen, that the clutch control magnet is energized, at such times, when the punch magnets 232 are energized to release the said latch levers 227, for effecting rotation of shaft 220.

Suitably disposed cam controlled contacts are provided, such as contacts C1 and C2, which are operated cyclically by related cam elements 309 secured to the shaft 220. The normally closed contacts C1 are included in the circuit to the clutch control magnet 300 as common timing control contacts (see Fig. 20B). The circuit controlled by these cam contacts will be explained in detail hereinbelow.

Additional controlling contacts are provided, for example, the suitably disposed tape controlled contacts 317 secured to upright plate 215. These contacts are controlled both upon the exhaustion of the tape supply to the punch station, and by the tautness of the tape supply. A contact operating arm 318 is secured to shaft 319 journaled in plates 215 and 221, which arm is constantly urged in a counterclockwise direction (Fig. 11) by the elongated spring blade of contacts 317. Also secured to shaft 319 is a dog member 320 having oppositely directed pins 321 fastened thereto. The spring urged tape lever 258 is pivotally mounted on shaft 319 and rides on the tape 200, thus preventing engagement of the lever and one of the pins 321. However, upon exhaustion of the tape, the lever 258 is rotated sufficiently in a clockwise direction to engage and partially rotate the dog member and operating arm 318 to open the contacts 317. A tape tension arm 322 having a roller 323 is also rotatably mounted on shaft 319, which arm 318 is urged in a counterclockwise direction by spring 324. In the event the tape supply to the punch station becomes too taut, the tape 200 is effective to cause the arm 322 to be partially rotated in a clockwise direction to engage the other pin 321 on the dog member 320, to rotate the latter and operating arm 318 to open the said contacts 317. The purpose of these contacts will be understood as the description progresses.

*Operation*

Referring now to Figs. 20A to 20D, arranged in vertical sequence, the operation of the described units will be explained in connection with the circuit diagram.

As mentioned hereinabove, the columns of data designations in the record cards must be sensed to determine the nature of the data designating perforations of each column, or whether a column is blank and devoid of any data designations, that is, each column of the card must be analyzed to determine whether the punched data are alphabetical or numerical. It also was mentioned that like code combinations are employed for designating alphabetical and numerical characters in the five-unit Baudot or Teletype code, thus, the data designating perforations in the telegraphic control tape must be preceded by a key code signal or designation, such as a "letters" or "figures" signal or designation.

In order to simplify the description to follow, assume that the first eighteen columns of the record card C to be sensed is arranged with data designations representing: 123 John Jones 567; and that the card sensing unit is conditioned so that the first column of the record card C is under the sensing brushes 12. Assume further, that the telegraphic tape 200 is properly positioned in the punch unit. For these assumed conditions, it is found that tape controlled contacts 317 are closed, and that the card lever contacts 156 are closed.

*Start.*—Upon depression of the start key (Fig. 20B), closure of contacts 350 establishes a circuit from conductor 360 (connected to one terminal of the power supply) through the said start contacts 350, coil of relay R20 to conductor 361 (connected to the other terminal of the said power supply), thus energizing said relay. A holding circuit for this relay is completed immediately from conductor 360 through the tape controlled contacts 317, contacts 351 of the stop key, contacts R20b, and coil of relay R20 to conductor 361.

Also, upon closure of the card lever contacts 156 (Fig. 20A), a circuit is completed from conductor 360 through normally closed latch contacts 35, conductor 362, said contacts 156, coil of relay R17 to conductor 361, thus, energizing this relay. A holding circuit is immediately completed for the said relay from said conductor 362 through contacts R17b, and coil of relay R17 to conductor 361. Contacts R17a are closed to complete a circuit from said conductor 362 through normally closed contacts R18a, said contacts R17a, normally closed skip lifter contacts 59, coils of brush magnet 92, normally closed cut-out contacts 116 to conductor 361, thus, energizing said brush magnet. Brush magnet contacts 95 are opened to prevent energization of relay R14 at this time.

Due to closure of contacts R20c (Fig. 20B), a circuit is completed from conductor 360 through the normally closed latch contacts 35, floating cam contacts 149, conductors 363 and 364, normally closed contacts R14c, said contacts R20c, and coil of relay R21 to conductor 361, energizing this relay. Closure of contacts R21a completes a circuit from said conductor 362 through contacts R21a, and coils of relays R22 and R24 to conductor 361, energizing said relays. Closure of contacts R22a then completes a circuit from said conductor 362 through said contacts R22a to coil of relay R23 and conductor 361, energizing said relay.

It is to be noted, that the series or chain of relays R21-R23 are energized successively, under control of the preceding relay in the chain, and constitute timing relays, the operations of which are adjusted so that the operations of the card sensing unit and tape punch units are synchronized properly, during the continuous operations of these units. It will be understood as the description progresses, that these timing relays permit the tape punch unit to be operated continuously, during a card sensing cycle, and thus permit the card sensing and tape punching functions to be effected at a relatively faster rate. However, until relay R19 is energized, these timing relays are not effective to exercise any control functions, which condition occurs only at the start of each tape run. It is to be noted that, until the stop contacts 351 or tape controlled contacts 317 are opened, relay R20 is maintained energized throughout each tape run, and through the agency of contacts R20c, permits a circuit to be completed to the first relay R21 of the chain of timing relays.

*Numerical data.*—In view of the assumed position of the card carriage, and upon closure of the latch contacts 35 and floating cam contacts 149, a circuit is completed from conductor 360 through said contacts 35 and 149, contact roll 91, brush 12 sensing the "1" perforation, coils of translating relay R1 and control relay R13, to the parallel connected contacts R10a and R12a, and conductor 361, energizing said relays.

Upon transfer of contacts R13a (Fig. 20B), a "figures" supervisory circuit is established from conductor 360 through latch contacts 35, floating cam contacts 149, conductors 363 and 364, closed contacts R21b, normally closed contacts R10b, R12b and R11b, said transferred contacts R13a, normally closed contacts R30a, and the pick-up coil of the "figures" control relay R25 (Fig. 20B) to conductor 361, energizing said relay. A holding circuit is established from conductor 360 through normally closed cam contacts C1, conductor 365, contacts R25a and holding coil of said relay R25 to conductor 361. Obviously, when cam contacts C1 are opened (see Fig. 19), this described holding circuit can no longer be maintained. Relay R28 is connected in parallel with the holding coil of relay R25, and is energized so long as cam contacts C1 are closed. Contacts R28a, included in the pickup circuit for relay R62 (Fig. 20D), are opened and prevent energization of this "line feed" distributing relay, while the said cam contacts C1 are closed.

Figure 20B:
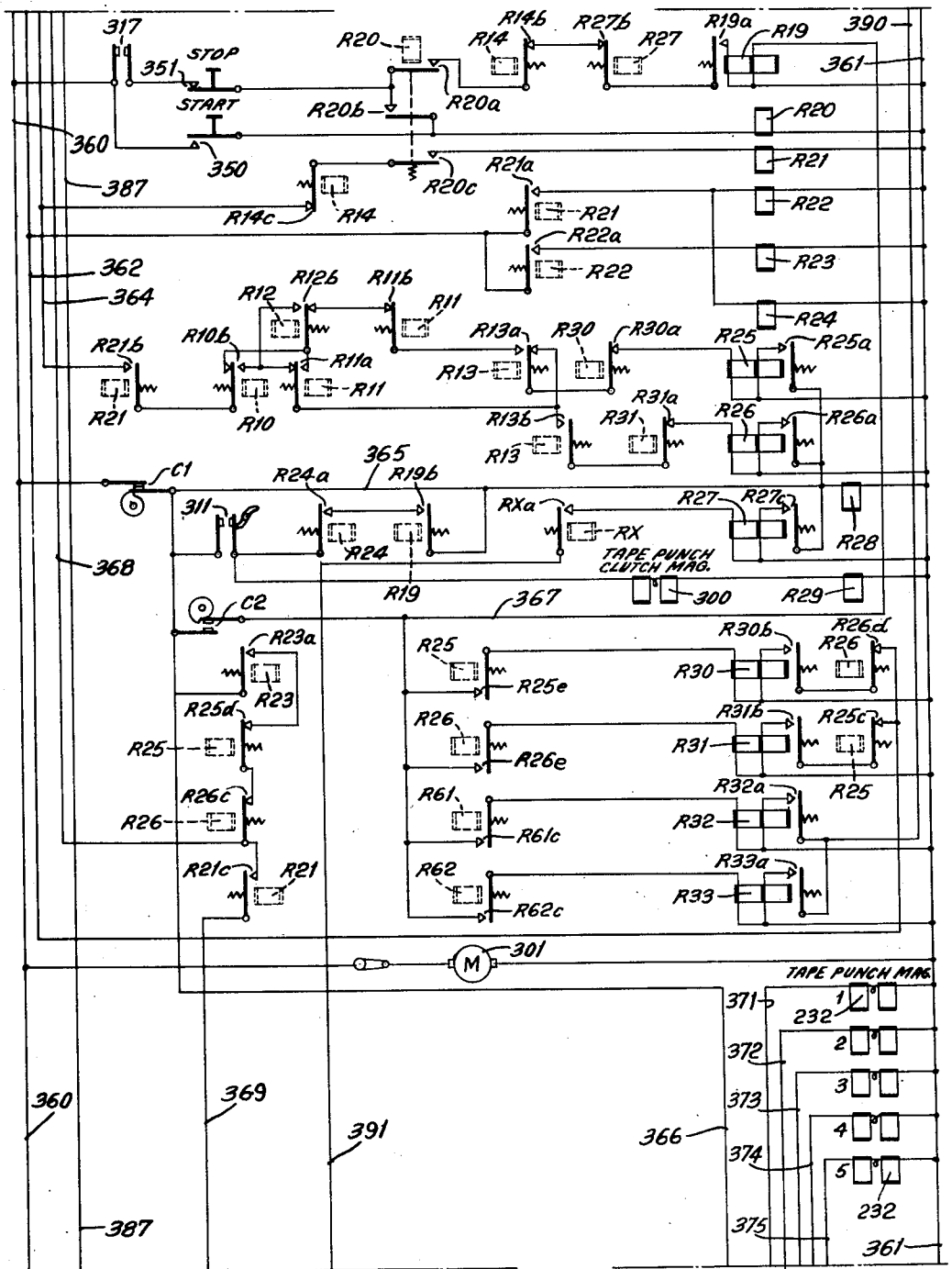
Figure 20D:
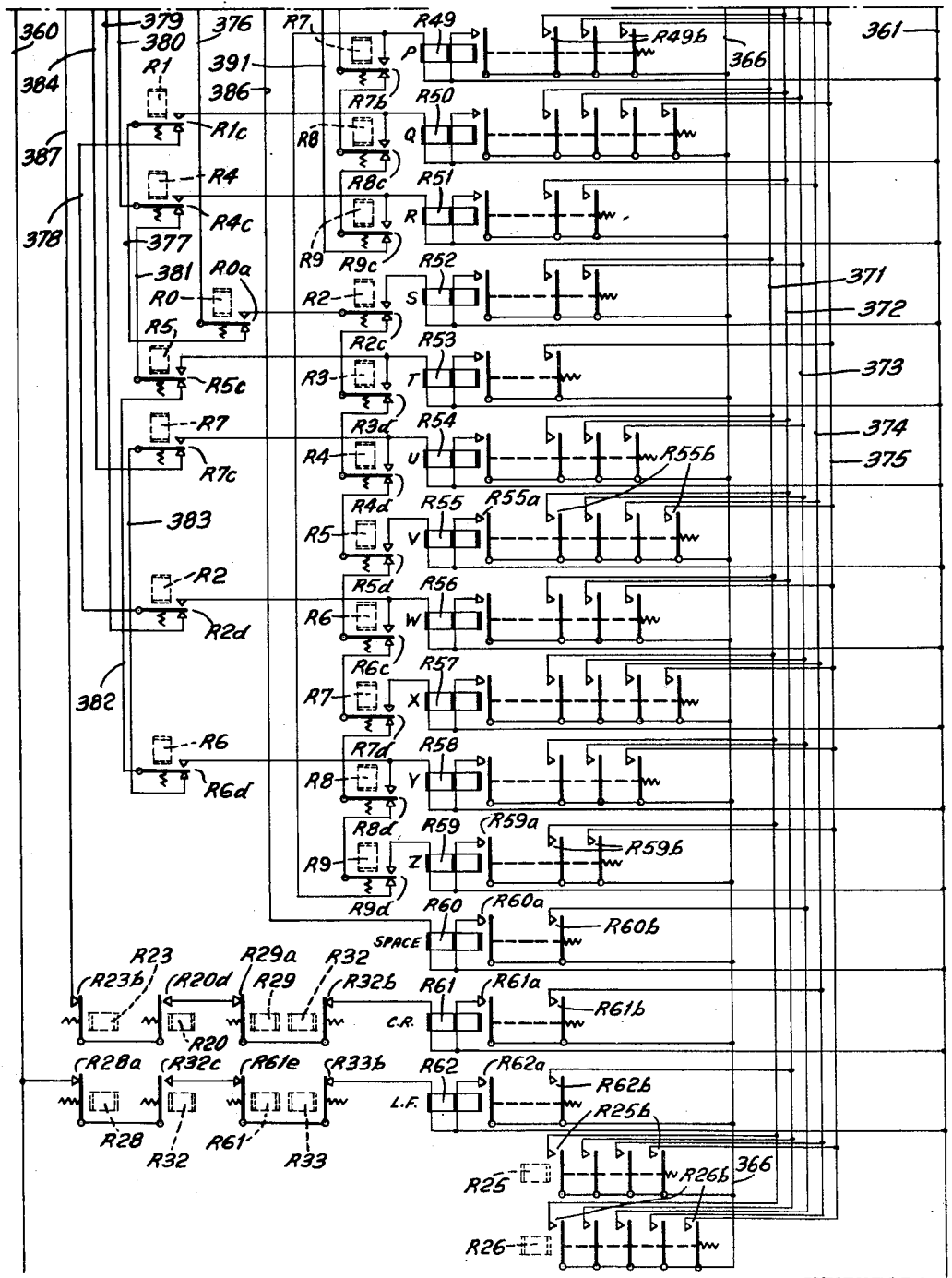

Opening of contacts R25c (Fig. 20B) prevents a holding circuit from being established for relay R31. Opening of contacts R25d prevents a circuit from being completed to the interconnected contacts of translating relays RR, RX, R0 and R1-R9 (Figs. 20C and D), which contacts, in turn, are connected to the group of distributing relays R34-R62 (Figs. 20C and 20D). Opening of contacts R25d also prevents a circuit from being completed to the escape magnet 40 via conductor 368. Closure of contacts R25e partially completes a circuit to a "figures" supervisory relay R30. Closure of contacts R25b (Fig. 20D) permits circuits to be established to the "1", "2", "4" and "5" tape punch magnets 232, which can be traced as follows: conductor 360, normally closed cam contacts C1, conductor 366, said "b" contacts of relay R25, conductors 371, 372, 374 and 375 to the said connected tape punch magnets 232 and conductor 361, energizing said magnets.

It is recalled, upon energization of any one of the magnets 232, the common contacts 311 are closed, due to the tripping of the related latch lever or levers 227. Closure of contacts 311 permits the following circuit to be established as follows: conductor 360, normally closed cam contacts C1, said contacts 311, the coils of the tape punch clutch magnet 300 and relay R29 to conductor 361, energizing the said magnet and relay. Energization of the said clutch magnet causes the punch eccentric to be set in motion for actuating the punch elements, thereby effecting the punching of the "figures" code designating perforations in the first transverse row of the telegraphic tape 200, as indicated in Fig. 9.

The opened contacts R29a (Fig. 20D), included in the pickup circuit of distributing relay R61, prevent energization of this "carriage return" distributing relay, while the tape punch clutch magnet 300 is energized. During the punching cycle, cam contacts C2 are closed (see Fig. 19) to complete a circuit to relay R30 as follows: conductor 360, cam contacts C1, said cam contacts C2, contacts R25e and the pickup coil of relay R30 to conductor 361, energizing said relay. A holding circuit for this relay can be traced from conductor 362 to normally closed contacts R26d, contacts R30b, the holding coil of relay R30 to conductor 361. Now, contacts R30a are opened to break the traced pickup circuit for relay R25. In this manner, repeated energizations of relay R25, and punching of the "figures" key code are prevented.

Another circuit is completed, upon closure of cam contacts C2 which can be traced from conductor 360, said cam contacts C1 and C2, conductor 367, pickup coil of relay R19 and conductor 361, energizing this relay. A holding circuit is established immediately from conductor 360 through tape controlled contacts 317, stop contacts 351, contacts R20a, R14b, R27b, R19a, the holding coil of relay R19 to conductor 361. Closure of contacts R19b now establishes a circuit, shunting the said contacts 311, which can be traced from conductor 360, cam contacts C1, said contacts R19b, R24a, clutch magnet 300 and relay R29 to conductor 361.

Upon the opening of cam contacts C1 and C2, which occurs approximately at the same time in the punch cycle (see Fig. 19), the holding circuit for relay R25 is opened to cause this relay to be deenergized. It is to be noted that the "figures" supervisory relay R30 remains energized, and is maintained so until the "letters" supervisory circuit to relay R26 is energized (contacts R26d are included in the traced holding circuit for relay R30). Also, the "figures" supervisory circuit cannot be energized again to pick up relay R25 until the said relay R30 is deenergized.

It should be understood from the description up to this point, that the described circuits for relay R25 are established before the circuit to the last relay R23 of the timing chain, so that faulty or unwanted circuits cannot be established to the said escape magnet (via conductor 368), and translating contacts and distributing relays (via conductor 369). In view of the fact, that the escape magnet 40 is not energized during this first punch cycle, the said translating relay R1 and control relay R13 remain energized. However, it is noted, that so long as numerical data is sensed to energize relay R13, circuits cannot be completed either to the "figures" or "letters" supervisory circuits including the related control relays R25 and R26, respectively. Also, since the floating cam contacts are not opened, at this time, the chain of timing relays R21-R23, and control relay R24 remain energized.

Now, upon closure of cam contacts C1, near the end of the first punch cycle, a circuit can be traced from conductor 360 through the said cam contacts C1, closed contacts R19b and R24a to the clutch magnet 300 and relay R29, to energize the said magnet and relay. In this manner, another punch cycle is initiated immediately, without awaiting the closure of contacts 311.

Another circuit can be traced from the said conductor 360 and cam contacts C1 through the series connected contacts R23a (now closed), R25d (normally closed), R26c (normally closed), and R21c (now closed), conductor 369, normally closed contacts RRa, conductor 370, normally closed contacts RXc, conductor 376, normally closed contacts R0a, conductor 377, transferred contacts R1c to the pickup coil of distributing relay R50 and conductor 361, energizing this relay. A holding circuit is established immediately through the associated "a" contacts as follows: conductor 360, cam contacts C1, conductor 366, contacts R50a, holding coil of relay R50 to conductor 361. The traced holding circuit for relay R50 applies to all of the holding circuits for the distributing relays of the group R34-R62, by means of the related "a" contacts and holding coils, and therefore need not be traced in detail hereinafter.

Circuits are also completed from the said conductor 366 through the "b" distributing relay contacts, namely R50b, to conductors 371, 372, 373 and 375, and the connected "1," "2," "3" and "5" tape punch magnets 232, energizing the said magnets. Hereinafter, these circuits traced to the punch magnets will be referred to as the punch magnet circuits completed through the "b" distributing relay contacts, since all the "b" contacts of relays R34-R62 are connected in varying combinations to the said conductors 371-375 and "1" to "5" punch magnets, respectively. In this manner, during the rotation of the punch eccentric means, the code designating perforations representing the numeral "1" are punched in the second transverse row of the telegraphic tape 200, as indicated in Fig. 9.

Before the said cam contacts C1 are opened during this second mentioned punch cycle, a circuit is also completed from conductor 360, cam contacts C1, the said series connected contacts R23a, R25d, R26c, conductor 368 to the escape magnet 40 and pickup coil of relay R16 to conductor 361, energizing the said magnet and relay. Contacts R16a (Fig. 20A) closing at this time exercise no controlling functions. The purpose of these contacts will be understood as the description progresses. The energization of the said escape magnet causes the card carriage to be advanced, one step, and present the next column of the card to the sensing station, in the manner set forth hereinbefore. It is remembered that the floating cam contacts 149 are opened each time the escape mechanism of the card carriage is operated.

Upon opening of the said cam contacts C1, the holding circuit for the selected distributing relay is broken, thus restoring the distributing relay and associated contacts to normal. The circuits traced to the translating relay contacts and escape magnet are also broken, upon opening of cam contacts C1. Opening of the floating cam contacts 149 causes the said translating relay R1 and control relay R13 to be deenergized. The circuit to the first relay R21 of the chain of timing relays R21-R23 is also broken at this time, causing relay R21 to be deenergized, and in turn, causing relays R22, R23, and R24 to be deenergized.

Now, upon presentation of the second card column to the sensing station, and upon closure of the floating cam contacts 149, the R2 translating relay and R13 control relay are energized. As stated before, transferring of contacts R13a, and closure of contacts R13b exercise no controlling functions over the "figures" or "letters" supervisory circuits, at this particular time. The circuit to the first relay R21 of the timing relays is established again, upon closure of the floating cam contacts, to cause the chain of relays R21-R23 to be picked up in succession, as described hereinabove. Upon closure of contacts R24a (relays R22 and R24 being connected in parallel), the clutch magnet 300 is energized to initiate the third punch cycle.

The advantages and functions of the described chain of timing relays should now be apparent. The individual relays of the chain control the conditioning of various associated circuits, so that those circuits requiring a longer period of energization to effectively energize the included electromagnetic means are properly conditioned and prepared, when the remaining circuits including relatively faster operating electromagnetic means are conditioned. For example, relays R22 and R24 are simultaneously energized, a predetermined time after the floating cam contacts 149 are closed, to complete a circuit to the tape punch clutch magnet 300. During the time this magnet is effectively energized, relay R23 is energized to establish circuits to the translating relay contacts and escape magnet 40, the latter requiring a comparatively long period of time to be effectively energized. The circuit to the escape magnet can be traced from conductor 360, cam contacts C1, series connected contacts R23a, R25d and R26c to conductor 368 and escape magnet 40. During the time the escape magnet is effectively energized, the following circuit is effective to cause energization of the "1", "2" and "5" punch magnets: conductor 360, cam contacts C1, the said series connected contacts R23a, R25d, R26c and R21c, conductor 369, normally closed contacts RRa, conductor 370, normally closed contacts RXc, conductor 376, normally closed contacts R0a, conductor 377, normally closed contacts R1c, conductor 378, transferred contacts R2d to the pickup coil of distributing relay R56 and conductor 361, energizing this relay. A holding circuit for relay R56 is established through its "a" contacts and holding coil. The "1", "2" and "5" punch magnets 232 are energized via the conductors 371, 372, and 375, respectively, and the "b" contacts of said distributing relay. In this manner, the said tape punch magnets are energized, during the time the escape magnet 40 is effectively energized, for subsequently causing the code designating perforations for the numeral "2" to be punched in the third transverse row of the telegraphic tape, as indicated in Fig. 9.

During the time the said perforations are punched, cam contacts C1 are opened. The effectively energized escape magnet 40 caused the presentation of the third column of the card to the sensing station. The floating cam contacts 149 are closed, before the end of the third punch cycle, to initiate the successive operations of the chain of timing relays, whereby the tape punch clutch magnet can be effectively energized again to initiate a fourth punch cycle, before the punch mechanism is latched in an inoperative condition, as described in the tape punch section. Thus, it it seen, that a very close and precise timing arrangement is provided between the card sensing and tape punch units, and that the actuating means of the latter are maintained operative continuously, instead of controlling the clutch mechanism of the punch unit in a start-stop manner, thereby providing a relatively high speed and continuously operating apparatus.

During the said fourth punch cycle, translating relay R3 is effective to condition the circuits connected to the translating relay contacts so as to select the distributing relay R38, precisely in the same manner as described hereinabove. The "b" contacts of this distributing relay are effective to cause energization of the "1" punch magnet 232; which magnet, in turn, is effective to cause the code designating perforation for the numeral "3" to be punched in the fourth row of the telegraphic tape 200, as indicated in Fig. 9. Upon effective energization of the escape magnet 40, as described, the fourth column of the card is presented to the sensing station.

*Alphabetical data.*—It is remembered in the chosen example, that the fourth column in the record card is perforated to represent the alphabetical character "J." Since the preceding column contained numerical data, it is necessary to control the punch unit so as to automatically punch the "letters" key before the code designation for "J" is punched in the telegraphic tape.

Upon closure of the floating cam contacts 149, circuits are completed from conductor 360 through latch contacts 35, said contacts 149, contact roll 91, brushes 12 sensing the "X" and "1" perforations, translating relays RX and R1, and control relays R11 and R13, respectively, to conductor 361, thus energizing the said translating and control relays. Also, upon closure of the said floating cam contacts, the chain of timing relays R21–R23 and relay R24 are energized, as described in detail hereinabove. In addition thereto, the "letters" supervisory circuit is completed to energize the "letters" control relay R26 as follows: said floating cam contacts 149, conductors 363 and 364, contacts R21b now closed, normally closed contacts R10b, transferred contacts R11a, contacts R13b now closed, normally closed contacts R31a to the pickup coil of said relay R26 and conductor 361, energizing the "letters" control relay. A holding circuit is established therefor, through closed cam contacts C1, contacts R26a and holding coil of relay R26. Contacts R26c are opened to prevent energization of the escape magnet 40. Contacts R26d are opened causing the "figures" supervisory relay R30 to be deenergized. Contacts R26b are closed causing the "1" to "5" punch magnets 232 to be energized. The tape punch clutch magnet 300 is energized as before, through contacts C1, R19b and R24a, thereby causing the latched punch levers to form the key code designation for alphabetical characters in the fifth transverse row in the telegraphic tape 200, as indicated in Fig. 9, namely, the "letters" key code or designation.

Upon closure of cam contacts C2, during this punch cycle, a circuit can now be completed to the "letters" supervisory relay R31 as follows: conductor 360, cam contacts C1 and C2, contacts R26e to the pickup coil of relay R31 and conductor 361, energizing the said "letters" supervisory relay. A holding circuit is established from conductor 362 through contacts R25c, R31b and holding coil of the said relay R31 to conductor 361. This holding circuit is maintained continuously so that the "letters" supervisory relay is held energized until the "figures" control relay R25 becomes energized. Opening of contacts R31a causes deenergization of the "letters" supervisory circuit including relay R26. Thus, it is seen, that the "figures" key code cannot be perforated until the "letters" supervisory relay is deenergized.

Since the escape magnet is not energized during this punch cycle, the said floating cam contacts remain closed, thus maintaining the said translating and control relays energized. The punch clutch magnet is energized upon closure of cam contacts C1 for initiating the sixth punch cycle.

During the sixth punch cycle, the following circuit is completed from conductor 360 to cam contacts C1, the series connected contacts R23a, R25d, R26c, and R21c, conductor 369, normally closed contacts RRa, conductor 370, transferred contacts RXc and R1b to the pickup coil of distributing relay R43 and conductor 360, energizing this relay. The usual distributing relay holding circuit through contacts R43a is established. Through the "b" contacts of relay R43, the "1," "2" and "4" punch magnets 232 are energized, thus causing the code designating perforations representing the alphabetical character of "J" to be punched in the sixth transverse row of the telegraphic tape 200, as indicated in Fig. 9.

During the sixth punch cycle, the circuit to the escape magnet 40 is also established through the series connected contacts R23a, R25d and R26c, energizing said magnet, and subsequently causing the next or fifth column of the card to be presented to the sensing station.

Upon closure of the floating cam contacts 149, the brushes 12 sense the "X" and "6" perforations, representing the alphabetical data "O" in the fifth column of the record card, causing energization of the translating relays RX and R6, and the control relays R11 and R13. Also, the timing relays R21–R23 and relay R24 are energized as before, as well as the clutch magnet 300. The "figures" and "letters" control relays R25 and R26 remain deenergized this cycle, and all immediate subsequent cycles, during which sensing of alphabetical data occurs. Circuits are completed through the cam contacts C1 and the series connected contacts R23a, R25d, R26c, and R21c to conductor 369, normally closed contacts RRa, conductor 370, transferred contacts RXc, normally closed contacts R1b, R2b, R3c, R4b, R5b and transferred contacts R6b to the pickup coil of distributing relay R48. The usual holding circuit through contacts R48a is established. The R48b contacts are now effective to energize the "4" and "5" punch magnets 232, thereby causing the code designating perforations representing the letter "O" to be punched in the seventh row of the telegraphic tape 200, as indicated in Fig. 9.

Similarly, upon sensing the data designating perforations for the alphabetical characters "H" and "N" in the sixth and seventh columns of the record card, the corresponding code designating perforations representing the said "H" and "N" characters are punched in the eighth and ninth rows, respectively, of the telegraphic tape 200, as indicated in Fig. 9.

*Blank columns.*—To continue with the chosen example, it is remembered that the eighth column of the record card is blank, and the description to follow applies to any blank columns detected on the card, so that repetition thereof will not be necessary. Upon feeding or advancing the blank eighth column to the sensing brushes, and upon closure of the floating cam contacts 149, no circuits can be completed to the translating and control relays. However, the chain of timing relays R21–R23 and relay R24, as well as the clutch magnet 300, are energized as usual.

A circuit can now be traced from conductor 360, cam contacts C1, the series connected contacts R23a, R25d, R26c and R21c, conductor 369, normally closed contacts RRa, conductor 370, normally closed contacts RXc, conductor 376, normally closed contacts R0a, conductor 377, normally closed contacts R1c, conductor 378, normally closed contacts R2d, conductor 379, normally closed contacts R3b, conductor 380, normally closed contacts R4c, conductor 381, normally closed contacts R5c, conductor 382, normally closed contacts R6d, conductor 383, normally closed contacts R7c, conductor 384, normally closed contacts R8b, conductor 385, normally closed contacts R9b, conductor 386 to the pickup coil of the distributing relay R60, energizing said relay. The usual holding circuit through contacts R60a is established; and by means of the distributing relay contacts R60b, a circuit is completed to the "3" punch magnet 232, causing a single perforation to be punched, in the "3" position, in the telegraphic tape 200, in the tenth row, as indicated in Fig. 9, representing a "space" signal or designation.

This space signal or designation is punched in the telegraphic tape each time a blank column in the card is detected. It is to be noted, that, in the instant case, the conditioned "figures" or "letters" supervisory relay R30 or R31, respectively, is not disturbed. For example, in the preceding cycles, during which alphabetical data were sensed and recorded, the "letters" supervisory relay R31 was maintained energized, by the holding circuit traced through contacts R31b and R25c. This holding circuit is not disturbed, therefore, it will not be necessary to cause a key code designation to be punched in the tape, if the data in the next column is alphabetical. Similarly, had the holding circuit for the "figures" supervisory relay R30 been established, immediately prior to the detection of the blank column, this holding circuit for said relay R30 would remain undisturbed; thus, upon the immediate sensing of a numerical designation, following the blank column detection, it would not be necessary to cause an additional numerical key code designation to be punched in the tape.

However, if desired, to restore either the "figures" supervisory relay to normal, upon detection of a blank column, or both the "figures" and "letters" supervisory relays to normal, it is only necessary to provide the "space" distributing relay R60 with additional normally closed contacts, which can be inserted in either the "figures" or both "figures" and "letters" holding circuits for the supervisory relays R30 and R31, respectively. It is then seen, that, upon energization of the "space" distributing relay, the "figures" or both "figures" and "letters" supervisory relays are restored to normal, so that the corresponding key code designations would have to be punched in the telegraphic tape immediately following the "space" signal or designation.

In the example set forth, the next five columns in the card, following the blank column are the alphabetical data "Jones," and as mentioned, the last data designations punched in the telegraphic tape prior to the "space" signal were alphabetical, therefore a key code designation will not be required to precede the code designations representing "Jones." In view of the detailed description just set forth regarding the sensing and punching of numerical and alphabetical data, it is believed that further description for the punching of the remaining data designations, indicated in Fig. 9 is not necessary.

*Carriage return and line feed signals.*—In order to further simplify this description, assume that the tape is punched under control of data in the card up to the last or 80th card column, in the manner set forth hereinabove. During the sensing of the 80th column, the escape magnet 40 is energized as before. It is remembered that the pickup coil of relay R16 (Fig. 20A) is included in the escape magnet circuit, and normally is energized, however, as mentioned, this relay is not effective to exercise any controlling functions during the normal sensing and punching cycles.

Now, upon energization of relay R16, with the card in the last column position, the closed last column contacts 145 permit a holding circuit for relay R16 to be established as follows: conductor 360, said last column contacts 145 and contacts R16a, the holding coil of relay R16, and conductor 361. Relay R18, being connected in parallel with the holding coil of relay R16, is also energized, upon closure of the last column contacts. Contacts R18a are opened to deenergize the brush magnet 92, which magnet, in turn, causes the related contacts 95 to be closed. Closure of contacts 95 effects energization of relay R14, and in turn, deenergization of relay R19, due to the opening of contacts R14b. Opening of contacts R14c prevents any energization of the chain of timing relays R21–R23, and relay R24.

Upon closure of contacts R16a and the last column contacts, a circuit is also completed from conductor 360 through these contacts, via conductor 387, contacts R23b, R20d, R29a and R32b, pickup coil of distributing relay R61 and conductor 361, energizing this relay. The usual distributing relay holding circuit is established through contacts R61a. The "4" punch magnet 232 is energized due to closure of the contacts R61b. Upon energization of the said punch magnet, as mentioned hereinabove, contacts 311 of the punch unit are closed and, since contacts R19b and R24a are open at this time, complete the circuit to the clutch magnet 300 and relay R29. Energization of relay R29 causes contacts R29a to open the described pickup circuit for distributing relay R61. In this manner, the code designating perforation for the "carriage return" signal is punched in the telegraphic tape, as indicated in Fig. 9.

During this punch cycle, upon closure of cam contacts C2, a circuit is completed from the said cam contacts through contacts R61c to the pickup coil of relay R32 and conductor 361, energizing this relay. A holding circuit is established from conductor 360, last column contacts 145, conductor 390, contacts R32a, to the holding coil of relay R32 and conductor 361. This holding circuit is maintained until the last column contacts 145 are opened. Contacts R32b in the pickup circuit of distributing relay R61 are opened, assuring that energization of this relay cannot occur again at this period.

Contacts R32c in the distributing relay R62 pickup circuit are closed, thus permitting a circuit to be completed from conductor 360, contacts R28a, R32c, R61e and R33b to the pickup coil of distributing relay R62 and conductor 361. This circuit is established before cam contacts C1 are closed to energize relay R28, which energization occurs each punch cycle to open the pickup circuit of relay R62. The usual holding circuit for this distributing relay is established through contacts R62a, upon closure of the cam contacts C1, and, by means of contacts R62b, the "2" punch magnet 232 is energized. Upon energization of the said punch magnet, contacts 311 are closed to energize the punch clutch magnet, and cause the code designating perforations for the "line feed" signal to be punched in the telegraphic tape, as indicated in Fig. 9.

Upon closure of cam contacts C2, a circuit is completed from these contacts through contacts R62c to the pickup coil of relay R33, energizing this relay. A holding circuit is established from the last column contacts 145, via conductor 390, contacts R33a, and holding coil of relay R33. Contacts R33b, in the pickup circuit for distributing relay R62, are opened to prevent further energization of this circuit.

In the instant case, the "carriage return" and "line feed" signals are punched successively in the telegraphic tape 200, during the period the record card is ejected. The eject magnet 79 is energized, upon closure of the last column contacts 145 and contacts R16a, since this magnet is also connected in parallel with the holding coil of relay R16.

As described hereinabove, upon completion of the card ejecting operation, the auto-start contacts 84 are closed to energize the trip magnet 32 (contacts 145 being closed at this time). It is recalled, that energization of the trip magnet 32 also causes the latch contacts 35 to be opened and contacts 36 to be closed. A circuit is now established from latch contacts 36 to the drive motor 281 of the card sensing unit, to cause the reciprocable card carriage to be returned to pick up a new card from the magazine, and present its first column to the card sensing position.

Upon opening of the last column contacts 145, the described holding circuits for relays R32 and R33 are broken, and these relays are restored to normal. Relay R18 is also deenergized at this time, however, the brush magnet 92 cannot be energized, upon closure of contacts R18a, due to the opened latch contacts 35. Upon positioning of the new card to the first column position, the latch contacts are restored to normal to condition the machine to normal for subsequent card sensing and punching operations, which operations are effected as just described.

"R," "X" and "0" designations.—Provision is also made in the present invention to record in the telegraphic tape 200 corresponding code designating perforations whenever the "R," "X," or "0" perforations are sensed and are not employed in any alphabetical combination. It is well known in the statistical machine art, that the "R" and "X" perforations are used separately and individually for functional control purposes in statistical machines. Thus, it might be desired to employ the present telegraphic tape for controlling the reproduction of punched record cards as well as control the operations of printing telegraph devices. In such cases, recording of the said "R" and "X" holes must be provided for. It is proposed to use the "figures" and "A" designating perforations in the telegraphic tape for representing the presence of an "R" perforation in the card, and the "figures" and "G" designating perforations for representing an "X" perforation. The "0" perforation in the record card when not used in combination represents the numeral zero.

Upon sensing an "R" perforation in any column in the card, the translating relay RR and control relay R10 are energized as described in detail hereinabove.

The chain of timing relays R21-R23 and relay R24 are energized as usual, as well as the clutch magnet 300. Assuming that the preceding data designations were alphabetical, the "figures" supervisory circuit is established as follows: floating cam contacts 149, conductors 363 and 364, contacts R21b now closed, transferred contacts R10b, normally closed contacts R11a, R13a, and R30a to the pick-up coil of relay R25 and conductor 361. The holding coil for relay R25 is established through cam contacts C1 and contacts R25a as described. Contacts R25c are opened to deenergize the "letters" supervisory relay R31. Contacts R25d are opened (it is remembered that these contacts are opened before R23a are closed) for preventing energization of the escape magnet 4, and completion of a circuit through the translating relay contacts. Contacts R25b cause energization of the "1," "2," "4" and "5" punch magnets 232, thereby effecting punching of the "figures" key code designation. It is remembered, upon closure of cam contacts C2, the "figures" supervisory relay R30 is picked up through contacts R25e, and held locked through the contacts R30b and R26d, until alphabetical data are sensed.

Then, during the following punch cycle, a circuit is completed from cam contacts C1 through the series connected contacts R23a, R25d, R25c, and R21c, conductor 369, transferred contacts RRa, normally closed contacts R1a, R2a, R3a, R4a, D5a, R6a, R7a, R8a, R9a, RXb, conductor 388 to the pick-up coil of distributing relay R34 and conductor 361, energizing said relay. The usual holding circuit through contacts R34a is established; and by means of contacts R34b, the "1" and "2" punch magnets are energized, subsequently causing the "1" and "2" code designating perforations to be formed in the tape. Obviously, had the "figures" supervisory relay R30 been energized, prior to the sensing of the "R" designation in the card, this last mentioned circuit would have been established during the preceding punch cycle, instead of the said following punch cycle.

Upon sensing an "0" perforation, the translating relay R0 and control relay R12 are effective, similarly as described hereinabove, to control the magnets of the punch unit to record the code designations for the numeral zero, namely the "2", "3" and "5" punch magnets. The "figures" key code is punched in the tape preceding the zero code designating perforations, if the preceding character happened to be alphabetical, precisely as described for the "R" designation.

The procedure for perforating the "figures" "G" code designations in the tape, upon sensing an "X" perforation in the card is similar to that for the "R" and "0" perforations. In the instant case, additional control circuits are provided for causing the card carriage to skip over predetermined columns or fields of the card, whenever an "X" perforation is sensed. In certain practices in printing telegraph systems, the "figures" "G" signal represents a "tabulate" signal, and is employed to tabulate the teleprinter paper carriage. Accordingly, it has been found desirable, to provide similar tabulating control means in the present case to control the card carriage, whereby multiple column spacing operations are effected.

Upon sensing an "X" perforation, the translating relay RX and control relay R11 are energized. The chain of timing relays R21—R23 and relay R24, as well as the clutch magnet 300, are energized as usual. In the event, the "figures" supervisory relay R30 is not energized, at this time, indicating an alphabetical control, the "figures" supervisory circuit including relay R25 is energized due to closure of contacts R11a. The "figures" code designation is punched in the telegraphic tape as described.

During the punch cycle, in which the "G" (TAB) code designation is recorded, a circuit is established from cam contacts C1 through the series connected contacts R23a, R25d, R26c, and R21c, conductor 369, normally closed contacts RRa, conductor 370, transferred contacts RXc, normally closed contacts R1b, R2b, R3c, R4b, R5b, R6b, R7b, R8c, R9c, conductor 391 to the pick-up coil of distributing relay R40, energizing this relay. The usual holding circuit through contacts R40a is established; and through contacts R40b, the "2," "4" and "5" punch magnets 232 are energized, subsequently causing the "tabulate" signal to be punched in the telegraphic tape 200.

Another circuit is completed from the said conductor 391 through the contacts RXa to the pick-up coil of relay R27 to conductor 361, energizing this relay. A holding circuit is established from cam contacts C1 through contacts R27c and holding coil of relay R27 to conductor 361. Contacts R27b open the holding circuit to the relay R19, so that during the following punching cycle, the clutch magnet 300 must be energized through contacts 311. This control arrangement is provided to insure that the operations of the sensing and punching units will not fall out of step, during multiple card column skipping operations. Relay R19 becomes effective again during the subsequent punch cycles, upon closure of cam contacts C2.

Closure of contacts R27a (Fig. 20A) establishes a circuit to the pick-up coil of relay R15 and skip magnet 56, energizing the said relay and magnet. A holding circuit for relay R15 is completed through latch contacts 35, conductor 362, contacts R63a, contacts R15a and the holding coil of said relay R15 and skip magnet 56. Upon effective energization of the skip magnet, and by means of a suitable skip bar, multiple column spacing, or skipping, of the card carriage is effected in the usual manner. During the skipping operation, the skip lifter contacts 59 are opened to effect the usual deenergization of brush magnet 92. It is to be noted, that the control circuits shown are arranged so that the conditioned "figures" or "letters" supervisory relays R30 or R31, respectively, remain undisturbed.

Under certain circumstances, in printing telegraph practice, it might be desirable to have the "figures" or both "figures" and "letters" key code designations recorded after a tabulating operation of the teleprinter. Provision in the present circuit arrangement can readily be made accordingly, by inserting additional normally closed contacts of relay R27 in the holding circuits for either the "figures" supervisory relay R30, or both the "figures" and "letters" supervisory relays, namely R30 and R31, respectively. Thus, upon energization of relay R27, the energized supervisory relay, at the time skipping operations commenced would be deenergized, thus, making it necessary for the punching unit to be operated an extra cycle, upon completion of the said skipping operation to punch the desired key code designation.

While there have been shown and described and pointed out the fundamental novel features of the invention as applied to a single modification, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for perforating a tape in the telegraphic code controlled by statistical records having columns of alphatical and numerical data indiscriminately recorded thereon in statistical code comprising means for feeding individual records, means for sensing the columns of coded data on a record, selectively controlled means for automatically determining whether the sensed data in each column is of the alphabetical or numerical group, a plurality of punch elements, supervisory means controlled by the said determining means for rendering certain code combinations of the punch elements effective for perforating key code designations in the telegraphic tape identifying the sensed data as alphabetical or numerical, a group of translating relay means called into action under control of the said supervisory means for translating the sensed data into telegraphic code, and a group of distributing relay means, one for each code designation to be recorded, selectively controlled by the said translating relay means for selectively rendering code combinations of punch elements effective for perforating character designations in the said tape in accordance with the sensed data.

2. The invention set forth in claim 1 wherein timing means are provided for cyclically rendering the said record feeding means operative, said timing means having means for maintaining the punch elements operative each cycle and insuring that the operations of the said feeding means and punch elements are maintained in unison.

3. The invention set forth in claim 1 wherein control circuits are provided for rendering the said record feeding means operative and for maintaining the punch elements operative, a chain of timing relays, means for rendering the relays of the chain operative successively, and means controlled by different operated relays of the chain for influencing the said control circuits, whereby the operations of the said feeding means and punch elements are maintained in synchronism.

4. The invention set forth in claim 1 wherein the said feeding means includes a positionable record card carriage and means for controlling the spacing of said carriage, and means under control of said translating means, upon the sensing of predetermined data, for rendering the said spacing control means operative, whereby multiple column spacing of the record card carriage is effected.

5. The invention set forth in claim 1 wherein he said feeding means includes a positionable record card carriage, record card ejecting means, means for rendering the said ejecting means operative when the said carriage reaches a predetermined position, and means under control of the said carriage for rendering certain code combinations of punch elements effective for perforating functional code designations in the tape during the record card ejecting operations.

6. The invention set forth in claim 1 wherein cyclically operable means are provided for rendering the said distributing relay means effective.

7. A perforating apparatus controlled by statistical records bearing columns of data comprising cyclically operable punch means, means for feeding each record step by step, means for sensing the columns of data on each record, means controlled by the latter for rendering the punch means effective to record data designations in accordance with the sensed data, a plurality of control circuits, one for controlling said record feeding means and another for controlling the operations of said punch means, a chain of timing relays having means for rendering each relay in the chain operative in succession, and means controlled by different relays of said chain for influencing the said control circuits, whereby the operations of the feeding and punching means are maintained in synchronism.

8. A perforating apparatus controlled by statistical records bearing columns of data comprising cyclically operable punch means, means for feeding each record step by step, means for sensing the columns of data on each record, translating means controlled by the latter for rendering the punch means effective to record data designations in accordance with the sensed data, a plurality of control circuits, one for controlling said record feeding means, one for controlling said translating means, and another for controlling the operations of said punch means, a chain of timing relays having means for rendering each relay in the chain operative in succession, and means controlled by different relays of said chain for influencing the said control circuits, whereby the said feeding, translating and punch means are rendered effective in a predetermined order.

9. A record controlled perforating apparatus comprising cyclically operable punch means, means for feeding individual data bearing records step by step, means for sensing the data on each record, means controlled by the latter for rendering the punch means effective to record data designations in accordance with the sensed data, a plurality of control circuits, one for controlling the operations of said record feeding means and another for controlling the operations of said punch means, timing means, and individual means controlled by said timing means in a predetermined order for influencing the said control circuits, whereby the operations of the feeding and punch means are maintained in synchronism.

10. The invention set forth in claim 9 having control means for normally rendering said punch means inoperative, said control means being controlled at predetermined intervals by said second mentioned control circuit for maintaining the punch means operative continuously.

11. Apparatus for perforating a tape in telegraphic code controlled by statistical cards having columns of data recorded thereon in statistical code comprising a plurality of punch elements, means for feeding each card step by step, said feeding means including a positionable card carriage and spacing control means, means for sensing the columns of data on each card, a group of relay means selectively controlled by the sensing means for translating the statistical data into telegraphic code and selectively rendering code combinations of punch elements effective for perforating data designations in the said tape in accordance with the sensed data, and additional relay means controlled by said translating means, upon the sensing of predetermined data which is to be recorded, for rendering the said spacing control means operative to effect multiple column spacing of the card carriage.

12. A perforating apparatus controlled by statistical cards bearing columns of data comprising punch means, means for feeding each card step by step, said feeding means including a positionable card carriage and spacing control means, means for sensing the columns of data on each card, translating means controlled by the latter for rendering the punch means effective to record data designations in accordance with the sensed data, and additional means controlled by said translating means, upon the sensing of predetermined data which is to be recorded, for rendering the said spacing control means operative, whereby multiple column spacing of the card carriage is effected.

13. Apparatus for perforating a tape in telegraphic code controlled by statistical cards having columns of data recorded thereon in statistical code comprising a plurality of punch elements, means for feeding each card step by step, said feeding means including a positionable card carriage and card ejecting means, means for sensing the columns of data on each card, means selectively controlled by the sensing means for translating the statistical data into telegraphic code and selectively rendering code combinations of punch elements effective for perforating data designations in the said tape in accordance with the sensed data, means under control of the card carriage for rendering the said ejecting means operative, and additional means under control of the card carriage for rendering certain code combinations of punch elements effective for perforating "carriage return" and "line feed" designations in the said tape during the ejecting operations.

14. The invention set forth in claim 13 wherein the said additional means includes a plurality of relay means and means for rendering the latter operative in succession for effecting the perforating of the last mentioned designations successively in the said tape.

15. The invention set forth in claim 13 wherein means are provided for rendering the said translating means ineffective during the said ejecting operations.

16. A perforating apparatus controlled by statistical cards bearing columns of data comprising a plurality of punch elements, means for feeding each card step by step, said feeding means including a positionable card carriage and card ejecting means, means for sensing the columns of data on each card, translating means controlled by the latter for selectively rendering code combinations of punch elements effective to record code designations in accordance with the sensed data, means under control of the card carriage for rendering the said ejecting means operative, and additional means under control of the card carriage for rendering certain code combinations of punch elements effective to record other code designations during the ejecting operations.

17. The invention set forth in claim 16 wherein means are provided for rendering the said translating means ineffective during the said card ejecting operations.

18. In an apparatus controlled by records having two different types of characters, such as numerical and alphabetical, represented thereon by positioned code points which are distinctively positioned for each character, in accordance with a statistical code; record reading means including means to sense the code representations of the characters successively; a group of code magnets; means comprising a group of distributing relays each adapted to distribute impulses to a different group of said code magnets, in accordance with a telegraphic code in which each of certain combinational operations of said code magnets representing different characters of one type, also represents a single character of the other type; translating relay means controlled by said reading means for energizing said distributing relays selectively to translate said record code into said telegraphic code; supervisory means controlled by said sensing means and differently responsive to the record code representations of the two different types of characters; said group of distributing relays including two designating relays adapted to operate said code magnets in either of two different and distinct key combinations designating, respectively, the two different types of characters; and means controlled by said supervisory means to energize said designating relays alternately, to cause the operation of the appropriate key combination of code magnets when said sensing means senses a change of the type of character on the record.

ALBERT W. MILLS.
EDWARD J. RABENDA.